(12) United States Patent
Bhagalia et al.

(10) Patent No.: US 6,175,560 B1
(45) Date of Patent: Jan. 16, 2001

(54) APPARATUS AND METHOD OF ESTABLISHING AND MAINTAINING COMMUNICATION PATHS IN A WIRELESS TELECOMMUNICATIONS SYSTEM

(75) Inventors: Shashikant Bhagalia, Pinner; Joemanne Chi Cheung Yeung, Wootton; Ian L. Cooper, Old Basing; Martin Lysejko, Bagshot; Guy A. Cooper, Windsor; Jonathan A. Thompson, Newbury, all of (GB)

(73) Assignee: Airspan Networks, Inc., Seattle, WA (US)

( * ) Notice: Under 35 U.S.C. 154(b), the term of this patent shall be extended for 0 days.

(21) Appl. No.: 08/973,581
(22) PCT Filed: Jun. 3, 1996
(86) PCT No.: PCT/US96/08565
§ 371 Date: Mar. 16, 1998
§ 102(e) Date: Mar. 16, 1998
(87) PCT Pub. No.: WO96/38930
PCT Pub. Date: Dec. 5, 1996

(30) Foreign Application Priority Data

| Jun. 2, 1995 | (GB) | 9510870 |
| Jun. 2, 1995 | (GB) | 9511167 |
| Jun. 2, 1995 | (GB) | 9511189 |
| Jun. 2, 1995 | (GB) | 9511192 |
| Jun. 7, 1995 | (GB) | 9511546 |
| Jun. 28, 1995 | (GB) | 9513166 |
| Jun. 28, 1995 | (GB) | 9513168 |
| Jun. 28, 1995 | (GB) | 9513170 |
| Jun. 28, 1995 | (GB) | 9513172 |

(51) Int. Cl.[7] .............................................. H04B 7/216
(52) U.S. Cl. ................................. 370/342; 370/320
(58) Field of Search .................... 370/342, 335, 370/320, 441

(56) References Cited

U.S. PATENT DOCUMENTS

| 4,763,324 | 8/1988 | Schwierz | 370/100 |
| 5,177,765 | 1/1993 | Holland et al. | 380/34 |
| 5,267,261 | * 11/1993 | Blakeney, II et al. | 370/335 |
| 5,287,355 | * 2/1994 | Takahashi et al. | 370/392 |
| 6,031,845 | * 2/2000 | Walding | 370/335 |

FOREIGN PATENT DOCUMENTS

| 0616480 | 9/1994 | (EP) | H04Q/7/04 |
| 9307702 | 4/1993 | (WO) | H04L/27/30 |

OTHER PUBLICATIONS

Masayasu Hata, "Frame Synchronization Characteristics in Degraded Bit–Error–Rate Conditions and Its Improvements", Electronics and Communications in Japan, vol. 66–B, No. 8, 1983, pp. 53–62.

* cited by examiner

Primary Examiner—Salvatore Cangialosi
(74) Attorney, Agent, or Firm—Baker Botts L.L.P.

(57) ABSTRACT

A wireless telecommunications systems (1) includes a central terminal (10) for transmitting and receiving radio frequency signals to and from a subscriber terminal (20). A downlink communication path is established from a transmitter (200) of the central terminal (10) to a receiver (202) of the subscriber terminal (20). A downlink signal (212) is transmitted from the transmitter (200) to the receiver (202) during setup and operation of the wireless telecommunications system (1). The receiver (202) of the subscriber terminal (20) compares a code and phase of a master code sequence that includes an orthogonal code in the downlink signal (212) to a code and phase of a slave code sequence of the receiver (202). The receiver (202) adjusts the phase of the slave code sequence until a match is obtained with the master code sequence. The receiver (202) monitors the downlink signal (212) to identify the frame alignment signal (232) and establishes the downlink communication path when two successive frame alignment signals (232) are identified. A channel identifier signal within the downlink signal is identified and used to identify the orthogonal code included in the master code sequence. The channel identifier signal is matched to a reference identifier code to verify that the correct downlink signal is being read.

24 Claims, 20 Drawing Sheets

RLT EPLD-DSP Interface Map

F000 (WR)—    PC Control Byte

| B7 | B6 | B5 | B4 | B3 | B2 | B1 | B0 |

B7..B0

| | | |
|---|---|---|
| 0C3H | Coarse Power Increment (1dB STEP) | High Rate |
| 0CCH | Coarse Power Decrement (1dB STEP) | High Rate |
| 0C0H | No change | High Rate |
| 0C5H | Fine Power Increment (0.1dB Step) | High Rate |
| 0CAH | Fine Power Decrement (0.1dB Step) | High Rate |
| 063H | Coarse Power Increment (1dB STEP) | Low Rate |
| 06CH | Coarse Power Decrement (1dB STEP) | Low Rate |
| 060H | No change | Low Rate |
| 065H | Fine Power Increment (0.1dB Step) | Low Rate |
| 06AH | Fine Power Decrement (0.1dB Step) | Low Rate |
| 03CH | Reset to minimum power output | |
| 0A5H | set to nominal power mode (using NVRAM value) | |

*NOTE: bit reversal takes place at the RNU, to decode the command bit reversed data must be used.

FIG. 15

CS Control Byte

| B7 | B6 | B5 | B4 | B3 | B2 | B1 | B0 |

B7..B0

| | | |
|---|---|---|
| 00AH | Fine Advance 1/16 step | High Rate, No Link |
| 005H | Fine Delay 1/16 step | High Rate, No Link |
| 003H | Coarse Advance 1/2 step | High Rate, No Link |
| 00CH | Coarse Delay 1/2 step | High Rate, No Link |
| 000H | No change | High Rate, No Link |
| 006H | Set RNU to AUTO frame mode | High Rate, No Link |
| 00FH | Reset RNU TX EPLD clock chain | High Rate, No Link |
| 02AH | Fine Advance 1/16 step | LOW Rate, No Link |
| 025H | Fine Delay 1/16 step | LOW Rate, No Link |
| 023H | Coarse Advance 1/2 step | LOW Rate, No Link |
| 02CH | Coarse Delay 1/2 step | LOW Rate, No Link |
| 020H | No change | LOW Rate, No Link |
| 026H | Set RNU to AUTO frame mode | LOW Rate, No Link |
| 02FH | Reset RNU TX EPLD clock chain | LOW Rate, No Link |
| 08AH | Fine Advance 1/16 step | High Rate, Link Up |
| 085H | Fine Delay 1/16 step | High Rate, Link Up |
| 083H | Coarse Advance 1/2 step | High Rate, Link Up |
| 08CH | Coarse Delay 1/2 step | High Rate, Link Up |
| 080H | No change | High Rate, Link Up |
| 086H | Set RNU to AUTO frame mode | High Rate, Link Up |
| 08FH | Reset RNU TX EPLD clock chain | High Rate, Link Up |

*FIG. 16*

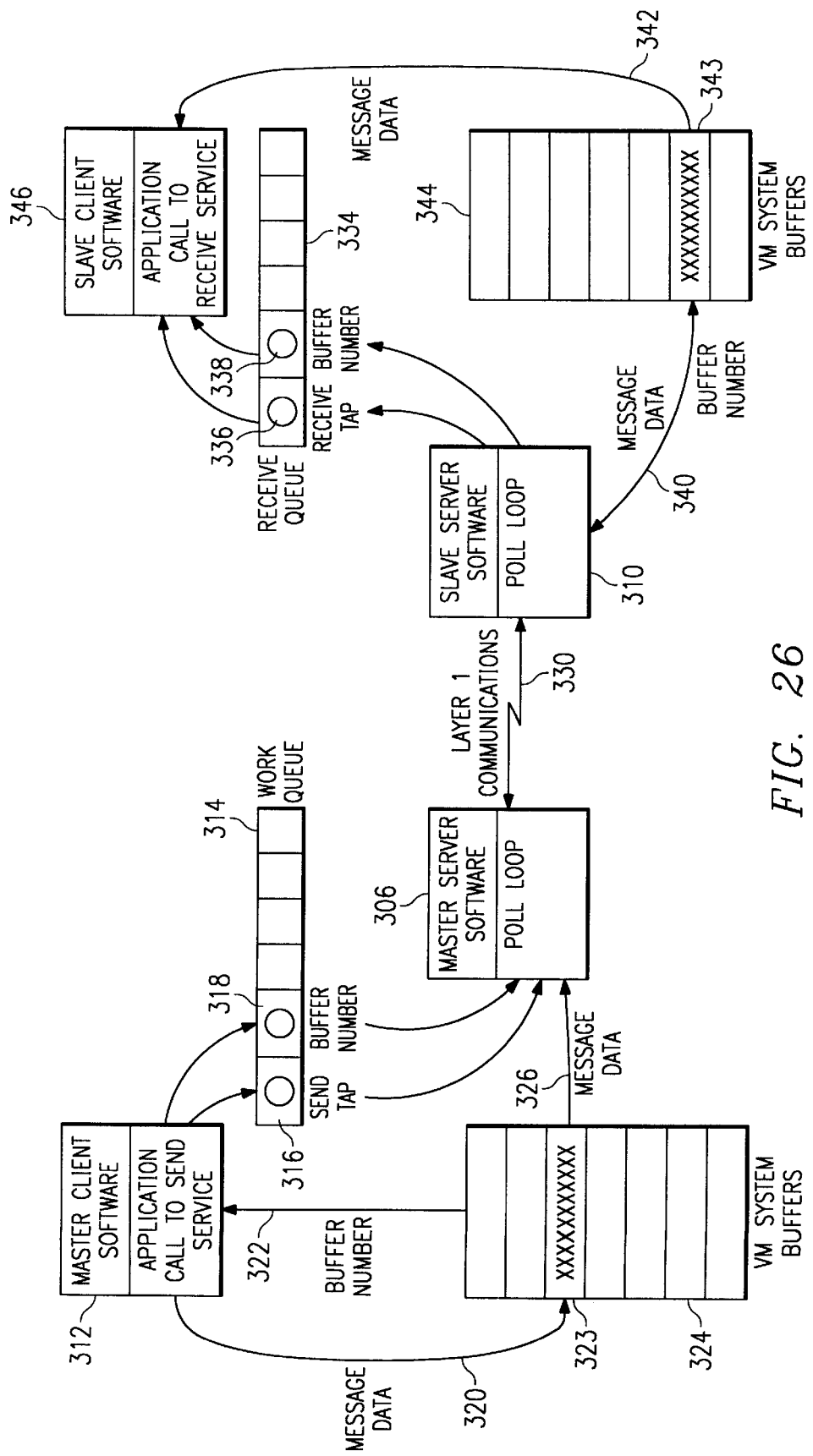

APPARATUS AND METHOD OF ESTABLISHING AND MAINTAINING COMMUNICATION PATHS IN A WIRELESS TELECOMMUNICATIONS SYSTEM

TECHNICAL FIELD OF THE INVENTION

The present invention relates in general to telecommunications systems and more particularly to an apparatus and method of establishing and maintaining communication paths in a wireless telecommunications system.

BACKGROUND OF THE INVENTION

Wireless telecommunications systems require transmitters and receivers in order to send and receive information over radio frequency signals in a network configuration. These transmitters and receivers may suffer from interference with other transmitters and receivers in and out of the network configuration. Such interference may be caused by each transmitter operating at a different transmitting power level. Control of the transmitting power of the transmitters has only been performed at each transmitter and not from a centralized location. Further, the transmitting power of a transmitter within a wireless telecommunication system has proved to be difficult to control with respect to the transmitting powers of other transmitters in the system. Therefore, it is desirable to obtain improved control of the transmitting power of each transmitter within a wireless telecommunications system.

Also, wireless telecommunications systems require radio links be established between corresponding transmitters and receivers in order to provide wireless communication transmissions. Interference and delays occur in achieving acquisition and establishment of each radio link. It becomes inefficient to acquire and establish a radio link every time a call is to be initiated. Problems with interference also occur if a radio link is maintained whether or not a call is in progress due to power needed to maintain the radio link. Therefore, it is desirable to avoid establishing a radio link for each call and avoid inserting interference into the wireless telecommunications system through continuous maintenance of a radio link.

Additionally, transmitters typically transmit signals at one phase and receivers typically receive signals at a different phase. The different phases used by transmitters and receivers in the system may cause problems in recognizing information from multiple transmitter and receiver pairs. Further, a receiver having one phase requires a greater amount of circuitry and software support to identify information from a corresponding transmitter operating at a different phase. Additionally, a phase difference between a receiver and transmitter may also be affected by changes in a path delay between the transmitter and the receiver. Therefore, it is desirable to be able to control the phase of transmitters and receivers in a wireless telecommunications system to provide improved radio frequency signal transmission.

Transmitters of the originating or destination sources may send information at one phase and the receivers of the destination or originating sources may receive information out of phase. In such a situation, the receivers will not know at what portion in the data stream the receive process has started. Information is partitioned into frames and to adequately process the information the beginning of each frame should be identified. Conventional techniques to frame align information are cumbersome, slow in frame identification, and may lose frames of information. Therefore, it is desirable to quickly and easily identify the beginning of each frame of information to achieve proper processing.

SUMMARY OF THE INVENTION

U.S. Pat. No. 5,177,765 describes a technique for acquiring and tracking a direct sequence, spread-spectrum Time Division Multiple Access (TDMA) or Time Division Duplex (TDD) signal, in which techniques are used to align a receiver's Pseudo Random Sequence Generator (PRSG) with a transmitter's acquisition code transmitted within a particular time slot at the beginning of each frame.

U.S. Pat. No. 4,763,324 describes a method of frame decoding used in a signal transmission system having a frame structure. In order to improve the level of freedom from disturbances, the synchronising information is uniformly distributed over the bit flow.

Viewed from a first aspect, the present invention provides a method of establishing a downlink communication path in a wireless telecommunications system, comprising the steps of: receiving a downlink signal having a master code sequence including an orthogonal code, wherein the downlink signal is received in an acquisition mode at a first transmitting power and a first transmitting rate; adjusting a code and phase of a receiver slave code sequence in response to a code and phase of the master code sequence in order to recognise the downlink signal; searching for a frame alignment signal within the downlink signal; reading the downlink signal in response to finding two successive frame alignment signals; identifying a channel identifier signal within the downlink signal, the channel identifier signal identifying the orthogonal code included in the master code sequence; matching the channel identifier signal to a reference identifier code to verify that the correct downlink signal is being read; acquiring the downlink signal in response to a successful match.

Viewed from a second aspect, the present invention provides a central terminal for wireless communication with a plurality of subscriber terminals at fixed distances in a wireless telecommunications network, comprising: a transmit/receive unit operable to transmit a downlink signal having a master code sequence including an orthogonal code, and to receive an uplink signal having a slave code sequence, the downlink signal including a frame alignment signal to indicate a beginning of a frame of information, a code synchronization signal to adjust a transmitting rate of the uplink signal, a power control signal to adjust a transmitting power for the uplink signal, and a channel identifier signal identifying the orthogonal code included in the master code sequence, the channel identifier signal being useable by a subscriber terminal receiving the downlink signal to verify that that subscriber terminal is the correct subscriber terminal to receive the downlink signal, prior to a communication link with that subscriber terminal being established; an analogue card operable to perform analog to digital conversion of the received uplink signal and digital to analog conversion for the transmitted downlink signal;

a modem card operable to perform convolution coding and spreading functions on the downlink signal, the modem card operable to perform synchronization recovery, despreading, and error correction functions on the uplink signal;

a tributary unit operable to interface the modem card with a wireline telecommunication network for the transmission and reception of calls to and from the subscriber terminals;

a shelf controller operable to communicate control and data information with the analogue card, the modem card, and the tributary unit, the shelf controller acting as a bus master and the analogue card, modem card, and tributary unit acting as bus slaves, the shelf controller communicating control and data information in a first balanced protocol with an external network controller and communicating control and data information with the analogue card, modem card, and tributary unit in a second unbalanced protocol.

Viewed from a third aspect, the present invention provides a subscriber terminal for a wireless telecommunications system operating at a fixed distance from a central terminal, comprising: a receiver interface operable to receive a downlink signal in an unbalanced protocol from the central terminal, the downlink signal having a master code sequence including an orthogonal code, the receiver interface separating the downlink signal into I and Q signal components; a code generator and despreader operable to adjust a code and phase of a slave code sequence associated with the subscriber terminal in order to match a code and phase of the master code sequence of the downlink signal; a convolutional decoder operable to perform forward error correction on the I and Q signal components of the downlink signal and generate a downlink frame information signal therefrom; a frame extractor operable to extract an overhead channel in the downlink frame information signal, the overhead channel including a frame alignment signal and a channel identifier signal, the channel identifier signal identifying the orthogonal code included in the master code sequence, the frame extractor being arranged to identify a beginning of frame position after recognising two successive frame alignment signals in order to read data in the downlink signal, the frame extractor being arranged to compare the channel identifier signal to a reference identifier code to verify that the correct downlink signal is being read prior to establishing a downlink communication path to the subscriber terminal.

In accordance with one aspect of the present invention, a method of controlling transmitting power in a subscriber terminal of a wireless telecommunications systems is provided which substantially eliminates or reduces disadvantages and problems associated with conventional wireless systems.

According to an embodiment of the present invention, a method of controlling transmitting power in a subscriber terminal of a wireless telecommunications system that includes establishing a downlink communication path from a transmitter of a central terminal to a receiver of the subscriber terminal. A downlink signal is transmitted from the transmitter of the central terminal and received at the receiver of the subscriber terminal. The downlink signal includes a power control signal that is used to adjust a transmitting power of the transmitter in the subscriber terminal in order to establish an uplink communication path between the transmitter of the subscriber terminal and a receiver at the central terminal.

One technical advantage of this aspect of the present invention is to externally control the transmitting power of the transmitter in the subscriber terminal. Another technical advantage is to control transmitting power through an overhead channel in the downlink signal from the central terminal to the subscriber terminal. Yet another technical advantage is to provide increasing and decreasing incremental adjustments to the transmitting power of the transmitter in the subscriber terminal. Still another technical advantage is to adjust the transmitting power to match the transmitting power of other subscriber terminals serviced by the central terminal.

In accordance with another aspect of the present invention, there is provided an apparatus and method of synchronizing a transmitter in a subscriber terminal of a wireless telecommunications system that substantially eliminates or reduces disadvantages and problems associated with conventional wireless communication techniques.

According to an embodiment of the present invention, a method of synchronizing a transmitter in a subscriber terminal of a wireless telecommunications system includes establishing a downlink communication path from a central terminal to the subscriber terminal. A downlink signal is transmitted from a transmitter in the central terminal and received at a receiver of the subscriber terminal. The receiver of the subscriber terminal extracts a code synchronization signal from the downlink signal. The code synchronization signal is used to adjust a phase of an uplink signal transmitted by a transmitter in the subscriber terminal. The receiver of the central terminal monitors the phase of the uplink signal and changes the code synchronization signal in order to obtain a match of the phase of the uplink signal to the phase at the receiver of the central terminal.

One technical advantage of this aspect of the present invention is to remotely adjust a transmitting phase of a transmitter in a subscriber terminal. Another technical advantage is to obtain a match of the transmitting phase of the transmitter in a subscriber terminal at a receiver of a central terminal. Yet another technical advantage is to embed a code synchronization signal within a downlink signal transmitted from a central terminal to incrementally adjust a transmitting phase of a transmitter in a subscriber terminal. Still another technical advantage is to continually monitor a transmitting phase of a transmitter in a subscriber terminal in order to maintain a match with the phase of a receiver in a central terminal.

In accordance with another aspect of the present invention, there is provided an apparatus and/or method of transmitting and receiving information in a wireless telecommunications system that substantially eliminates or reduces disadvantages and problems associated with conventional wireless communication techniques.

According to an embodiment of the present invention, a method of transmitting information in a wireless telecommunications system includes transmitting a downlink signal at a first transmitting power and first transmitting rate in an acquisition mode to establish a downlink communication path. The downlink signal is transmitted at a second transmitting power and the first transmitting rate in a standby mode after establishment of the downlink communication path. The downlink signal is transmitted at the first transmitting power and a second transmitting rate upon a request for a wireless telephone call.

One technical advantage of this aspect of the present invention is to provide multiple operating modes having different transmitting powers and different transmitting rates. Another technical advantage is to provide low transmitting power at a low transmit rate during system idle periods. Yet another technical advantage is to efficiently change between different transmitting powers and different transmit rates.

In accordance with another aspect of the present invention, there is provided an apparatus and/or method of establishing a downlink communication path in a wireless telecommunications system that substantially eliminates or reduces disadvantages and problems associated with conventional wireless communication techniques.

According to an embodiment of the present invention, a method of establishing a downlink communication path in a wireless telecommunications system includes transmitting a downlink signal having a master code sequence from a transmitter in a central terminal. The downlink signal is received at a receiver in a subscriber terminal having a slave code sequence. The receiver in the subscriber terminal compares its slave code sequence to the master code sequence of the downlink signal for a code and phase match. The receiver adjusts the phase of its slave code sequence to match the phase of the master code, determining a path delay from the transmitter in the central terminal to the receiver in the subscriber terminal.

One technical advantage of this aspect of the present invention is to match a receiver slave code sequence to a master code sequence of a downlink signal. Another technical advantage is to adjust a phase of a slave code sequence of a receiver to match a phase of a master code sequence in a downlink signal. Yet another technical advantage is to provide fine and coarse incremental adjustments to a phase of a slave code sequence of a receiver. Still another technical advantage is to measure a combined power level of a slave code sequence and a master code sequence in order to obtain a code sequence match.

In accordance with another aspect of the present invention, there is provided an apparatus and/or a method of frame aligning information in a wireless telecommunications system that substantially eliminates or reduces disadvantages and problems associated with conventional frame alignment techniques.

According to an embodiment of the present invention, a method of frame aligning information in a wireless telecommunications system includes receiving at a receiver of a subscriber terminal a downlink signal carrying the information transmitted by a transmitter in a central terminal. A beginning of frame position for a frame of information is identified from the downlink signal. To ensure accurate frame alignment, a successive beginning of frame position of a successive frame of information is identified. Upon successfully identifying two successive beginning of frame positions, a downlink communication path is established from the transmitter of the central terminal to the receiver of the subscriber terminal.

One technical advantage of this aspect of the present invention is to accurately identify a beginning of frame position for a frame of information. Another technical advantage is to incrementally step through the bit positions of the downlink signal to identify the beginning of frame position. Yet another technical advantage is to decode a frame alignment word representing the beginning of frame position into an overhead channel of the downlink signal. Still another technical advantage is to continuously monitor the beginning of frame position for subsequent frames of information.

BRIEF DESCRIPTION OF THE DRAWINGS

An embodiment of the invention will be described hereinafter, by way of example only, with reference to the accompanying drawings in which like reference signs are used for like features and in which:

FIG. 15 is a tabular depiction of a power control signal in an overhead channel of the downlink signal;

FIG. 16 is a tabular depiction of a code synchronization signal in the overhead channel of the downlink signal;

FIG. 26 is a schematic diagram illustrating the sending of a message from the shelf controller to a slave element;

DETAILED DESCRIPTION OF THE INVENTION

Figure 1:
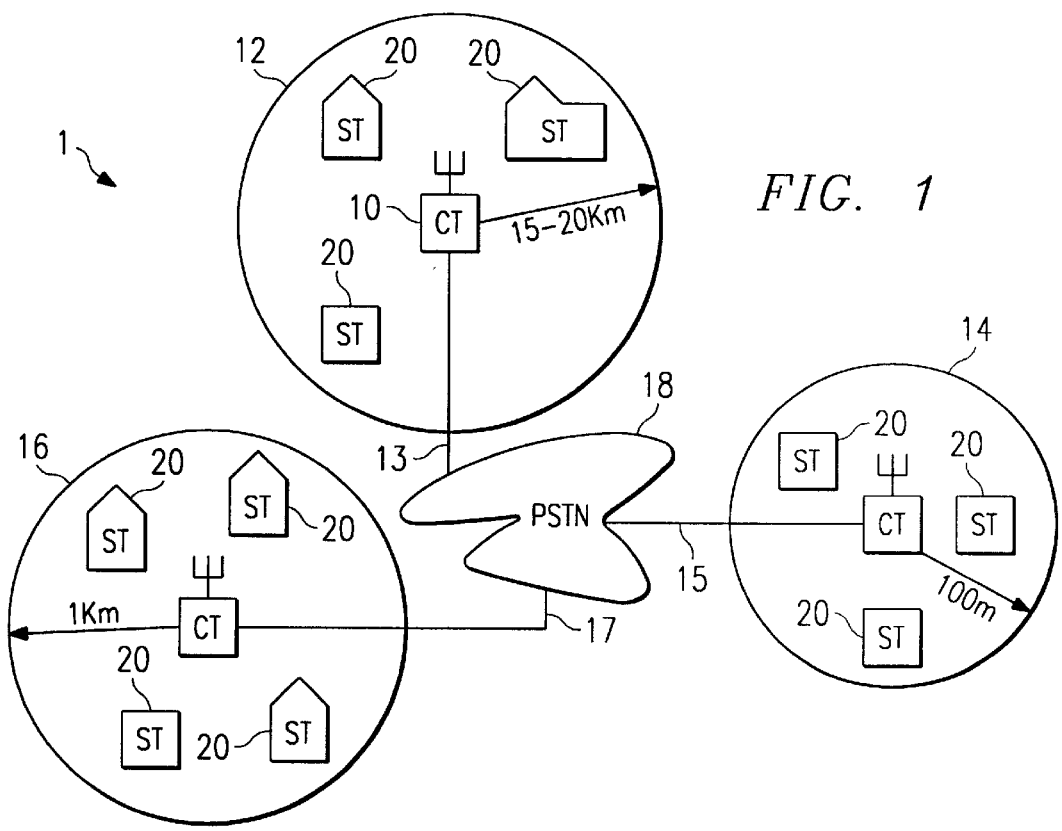
FIG. 1 is a schematic overview of an example of a wireless telecommunications system in which an example of the present invention is included.

FIG. 1 is a schematic overview of an example of a wireless telecommunications system. The telecommunications system includes one or more service areas 12, 14 and 16, each of which is served by a respective central terminal (CT) 10 which establishes a radio link with subscriber terminals (ST) 20 within the area concerned. The area which is covered by a central terminal 10 can vary. For example, in a rural area with a low density of subscribers, a service area 12 could cover an area with a radius of 15–20 Km. A service area 14 in an urban environment where is there is a high density of subscriber terminals 20 might only cover an area with a radius of the order of 100 m. In a suburban area with an intermediate density of subscriber terminals, a service area 16 might cover an area with a radius of the order of 1 Km. It will be appreciated that the area covered by a particular central terminal 10 can be chosen to suit the local requirements of expected or actual subscriber density, local geographic considerations, etc, and is not limited to the examples illustrated in FIG. 1. Moreover, the coverage need not be, and typically will not be circular in extent due to antenna design considerations, geographical factors, buildings and so on, which will affect the distribution of transmitted signals.

The central terminals 10 for respective service areas 12, 14, 16 can be connected to each other by means of links 13, 15 and 17 which interface, for example, with a public switched telephone network (PSTN) 18. The links can include conventional telecommunications technology using copper wires, optical fibers, satellites, microwaves, etc.

The wireless telecommunications system of FIG. 1 is based on providing fixed microwave links between subscriber terminals 20 at fixed locations within a service area (e.g., 12, 14, 16) and the central terminal 10 for that service area. In a preferred embodiment each subscriber terminal 20 is provided with a permanent fixed access link to its central terminal 10. However, in alternative embodiments demand-based access could be provided, so that the number of subscribers which can be serviced exceeds the number of telecommunications links which can currently be active.

Figure 2:
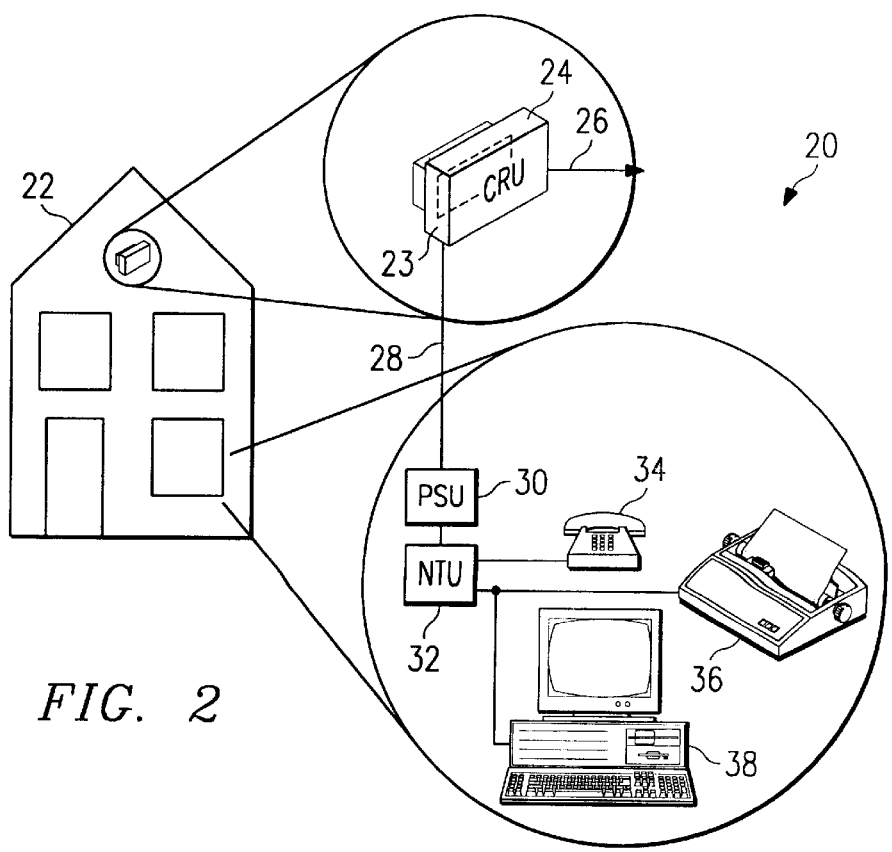
FIG. 2 is a schematic illustration of an example of a subscriber terminal of the telecommunications system of FIG. 1.

FIG. 2 illustrates an example of a configuration for a subscriber terminal 20 for the telecommunications system of FIG. 1. FIG. 2 includes a schematic representation of customer premises 22. A customer radio unit (CRU) 24 is mounted on the customer's premises. The customer radio unit 24 includes a flat panel antenna or the like 23. The customer radio unit is mounted at a location on the customer's premises, or on a mast, etc., and in an orientation such that the flat panel antenna 23 within the customer radio unit 24 faces in the direction 26 of the central terminal 10 for the service area in which the customer radio unit 24 is located.

The customer radio unit 24 is connected via a drop line 28 to a power supply unit (PSU) 30 within the customer's premises. The power supply unit 30 is connected to the local power supply for providing power to the customer radio unit 24 and a network terminal unit (NTU) 32. The customer radio unit 24 is also connected to via the power supply unit 30 to the network terminal unit 32, which in turn is connected to telecommunications equipment in the customer's premises, for example to one or more telephones 34, facsimile machines 36 and computers 38. The telecommunications equipment is represented as being within a single customer's premises. However, this need not be the case, as the subscriber terminal 20 preferably supports either a single or a dual line, so that two subscriber lines could be supported by a single subscriber terminal 20. The subscriber terminal 20 can also be arranged to support analogue and digital telecommunications, for example analogue communications at 16, 32 or 64 kbits/sec or digital communications in accordance with the ISDN BRA standard.

Figure 3:
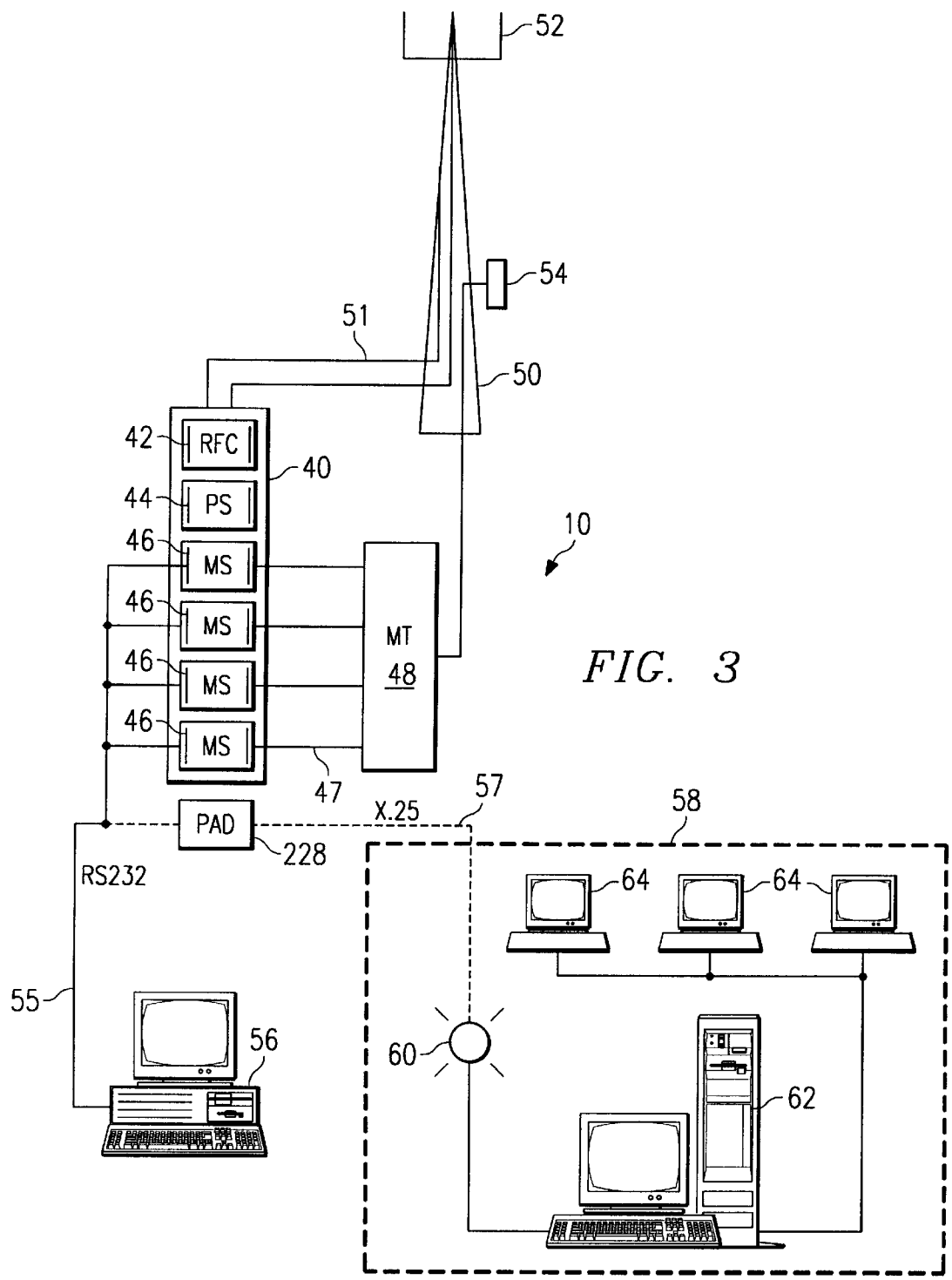
FIG. 3 is a schematic illustration of an example of a central terminal of the telecommunications system of FIG. 1.

FIG. 3 is a schematic illustration of an example of a central terminal of the telecommunications system of FIG. 1. The common equipment rack 40 comprises a number of equipment shelves 42, 44, 46, including a RF Combiner and power amp shelf (RFC) 42, a Power Supply shelf (PS) 44 and a number of (in this example four) Modem Shelves (MS) 46. The RF combiner shelf 42 allows the four modem shelves 46 to operate in parallel. It combines and amplifies the power of four transmit signals, each from a respective one of the four modem shelves, and amplifies and splits received signals four way so that separate signals may be passed to the respective modem shelves. The power supply shelf 44 provides a connection to the local power supply and fusing for the various components in the common equipment rack 40. A bidirectional connection extends between the RF combiner shelf 42 and the main central terminal antenna 52, typically an omnidirectional antenna, mounted on a central terminal mast 50.

This example of a central terminal 10 is connected via a point-to-point microwave link to a location where an interface to the public switched telephone network 18, shown schematically in FIG. 1, is made. As mentioned above, other types of connections (e.g., copper wires or. optical fibres) can be used to link the central terminal 10 to the public switched telephone network 18. In this example the modem shelves are connected via lines 47 to a microwave terminal (MT) 48. A microwave link 49 extends from the microwave terminal 48 to a point-to-point microwave antenna 54 mounted on the mast 50 for a host connection to the public switched telephone network 18.

A personal computer, workstation or the like can be provided as a site controller (SC) 56 for supporting the central terminal 10. The site controller 56 can be connected to each modem shelf of the central terminal 10 via, for example, RS232 connections 55. The site controller 56 can then provide support functions such as the localization of faults, alarms and status and the configuring of the central terminal 10. A site controller 56 will typically support a single central terminal 10, although a plurality of site controllers 56 could be networked for supporting a plurality of central terminals 10.

As an alternative to the RS232 connections 55, which extend to a site controller 56, data connections such as an X.25 links 57 (shown with dashed lines in FIG. 3) could instead be provided from a pad 228 to a switching node 60 of an element manager (EM) 58. An element manager 58 can support a number of distributed central terminals 10 connected by respective connections to the switching node 60. The element manager 58 enables a potentially large number (e.g., up to, or more than 1000) of central terminals 10 to be integrated into a management network. The element manager 58 is based around a powerful workstation 62 and can include a number of computer terminals 64 for network engineers and control personnel.

Figure 3A:
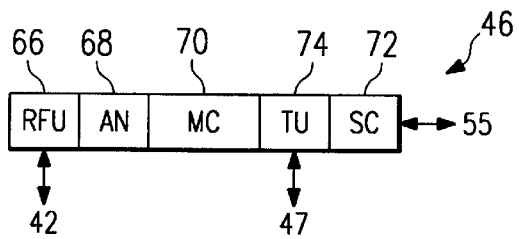
FIG. 3A is a schematic illustration of a modem shelf of a central terminal of the telecommunications system of FIG. 1.

FIG. 3A illustrates various parts of a modem shelf 46. A transmit/receive RF unit (RFU—for example implemented on a card in the modem shelf) 66 generates the modulated transmit RF signals at medium power levels and recovers and amplifies the baseband RF signals for the subscriber terminals. The RF unit 66 is connected to an analogue card (AN) 68 which performs A-D/D-A conversions, baseband filtering and the vector summation of 15 transmitted signals from the modem cards (MCs) 70. The analogue unit 68 is connected to a number of (typically 1–8) modem cards 70. The modem cards perform the baseband signal processing of the transmit and receive signals to/from the subscriber terminals 20. This includes ½ rate convolution coding and x16 spreading with CDMA codes on the transmit signals, and synchronization recovery, de-spreading and error correction on the receive signals. Each modem card 70 in the present example has two modems, each modem supporting one subscriber link (or two lines) to a subscriber terminal 20. Thus, with two modems per card and 8 modems per modem shelf, each modem shelf could support 16 possible subscriber links. However, in order to incorporate redundancy so that a modem may be substituted in a subscriber link when a fault occurs, only up to 15 subscriber links are preferably supported by a single modem shelf 46. The 16th modem is then used as a spare which can be switched in if a failure of one of the other 15 modems occurs. The modem cards 70 are connected to the tributary unit (TU) 74 which terminates the connection to the host public switched telephone network 18 (e.g., via one of the lines 47) and handles the signaling of telephony information to, for example, up to 15 subscriber terminals (each via a respective one of 15 of the 16 modems).

Figure 4:
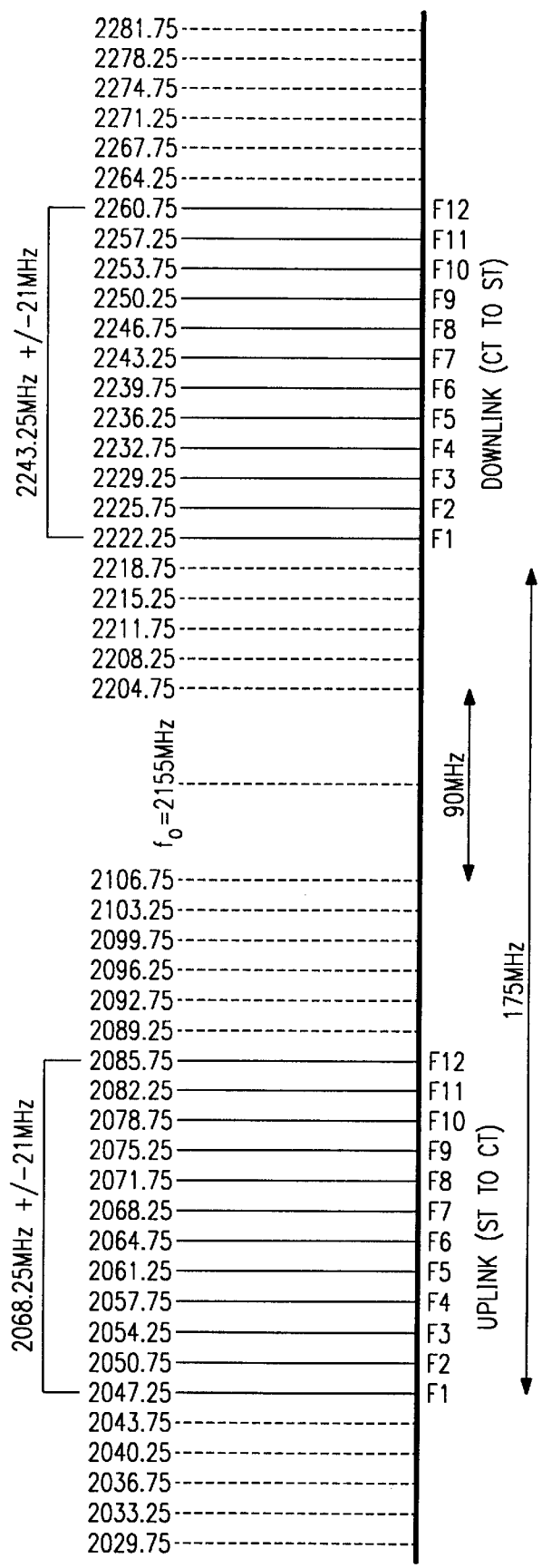
FIG. 4 is an illustration of an example of a frequency plan for the telecommunications system of FIG. 1.

The wireless telecommunications between a central terminal 10 and the subscriber terminals 20 could operate on various frequencies. FIG. 4 illustrates one possible example of the frequencies which could be used. In the present example, the wireless telecommunication system is intended to operate in the 1.5–2.5 GHz Band. In particular the present example is intended to operate in the Band defined by ITU-R (CCIR) Recommendation F.701 (2025–2110 MHz, 2200–2290 MHz). FIG. 4 illustrates the frequencies used for the uplink from the subscriber terminals 20 to the central terminal 10 and for the downlink from the central terminal 10 to the subscriber terminals 20. It will be noted that 12 uplink and 12 downlink radio channels of 3.5 MHz each are provided centered about 2155 MHz. The spacing between the receive and transmit channels exceeds the required minimum spacing of 70 MHz.

In the present example, as mentioned above, each modem shelf will support 1 frequency channel (i.e. one uplink frequency plus the corresponding downlink frequency). Up to 15 subscriber links may be supported on one frequency channel, as will be explained later. Thus, in the present embodiment, each central terminal 10 can support 60 links, or 120 lines.

Typically, the radio traffic from a particular central terminal 10 will extend into the area covered by a neighboring central terminal 10. To avoid, or at least to reduce interference problems caused by adjoining areas, only a limited number of the available frequencies will be used by any given central terminal 10.

Figure 5A:
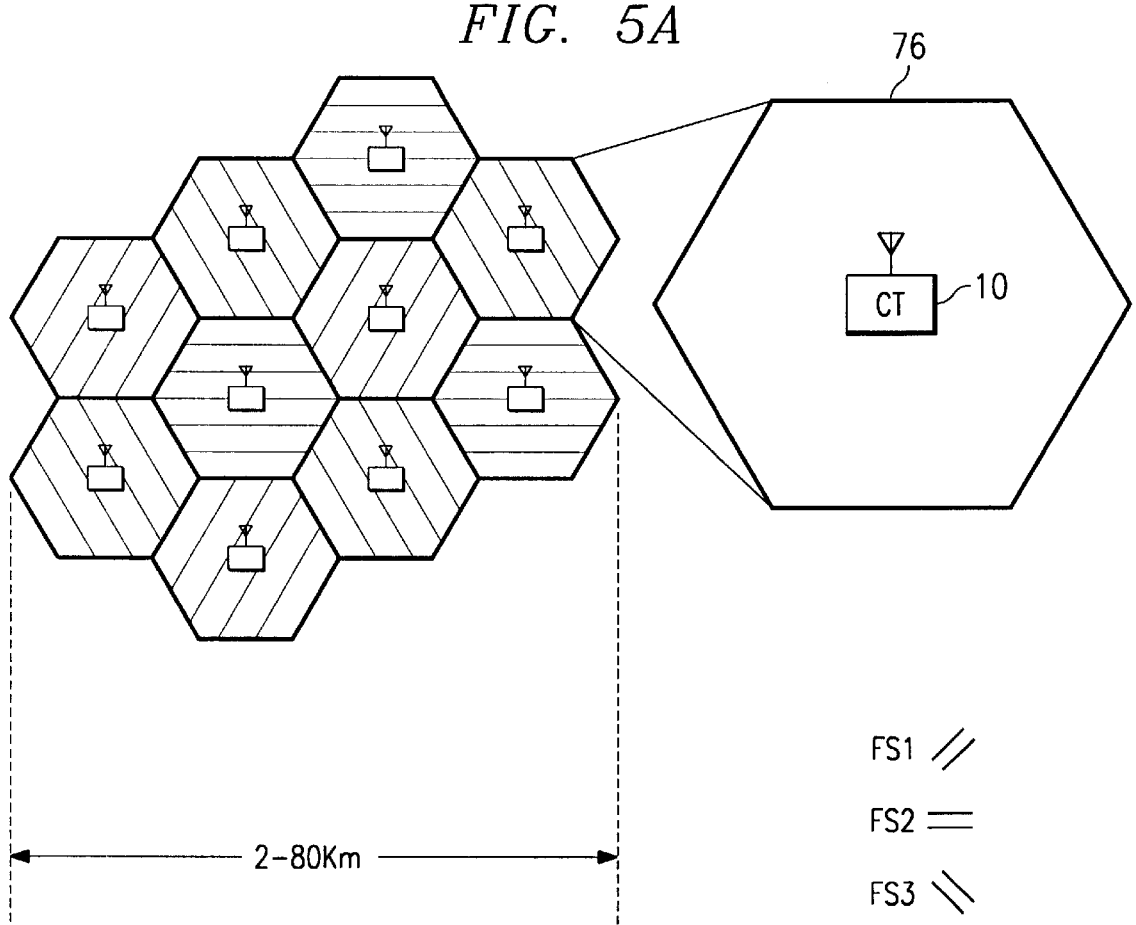
FIGS. 5A and 5B are schematic diagrams illustrating possible configurations for cells for the telecommunications system of FIG. 1.

FIG. 5A illustrates one cellular type arrangement of the frequencies to mitigate interference problems between adjacent central terminals 10. In the arrangement illustrated in FIG. 5A, the hatch lines for the cells 76 illustrate a frequency set (FS) for the cells. By selecting three frequency sets (e.g., where: FS1=F1, F4, F7, F10; FS2=F2, F5, F8, F11; FS3=F3, F6, F9, F12), and arranging that immediately adjacent cells do not use the same frequency set (see, for example, the arrangement shown in FIG. 5A), it is possible to provide an array of fixed assignment omnidirectional cells where interference between nearby cells can be avoided. The transmitter power of each central terminal 10 is set such that transmissions do not extend as far as the nearest cell which is using the same frequency set. Thus each central terminal 10 can use the four frequency pairs (for the uplink and downlink, respectively) within its cell, each modem shelf in the central terminal 10 being associated with a respective RF channel (channel frequency pair).

Figure 5B:
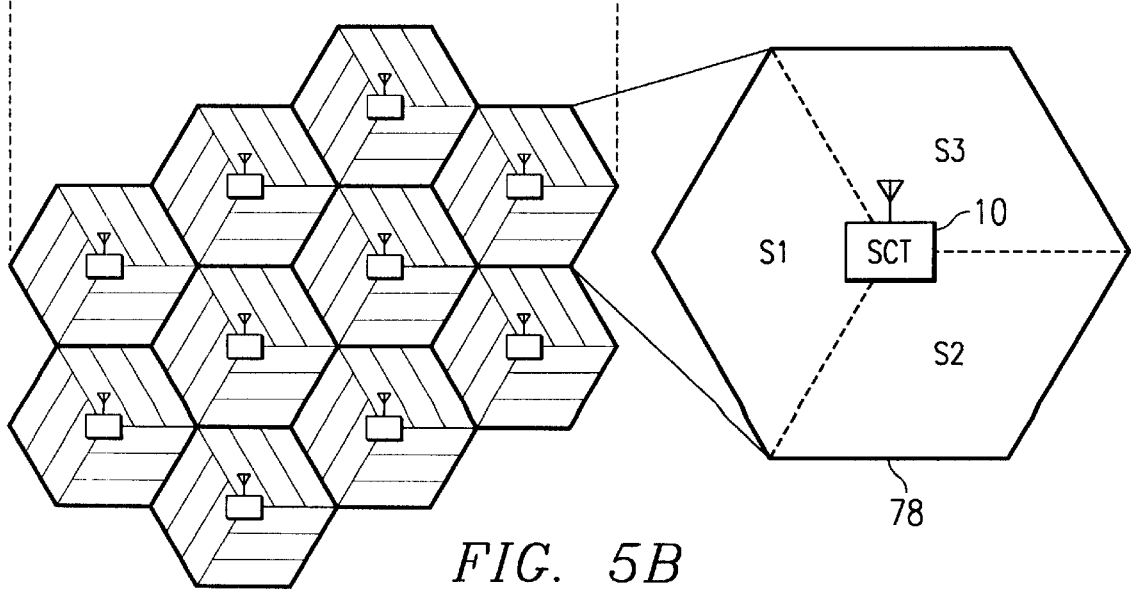

With each modem shelf supporting one channel frequency (with 15 subscriber links per channel frequency) and four modem shelves, each central terminal 10 will support 60 subscriber links (i.e., 120 lines). The 10 cell arrangement in FIG. 5A can therefore support up to 600 ISDN links or 1200 analogue lines, for example. FIG. 5B illustrates a cellular type arrangement employing sectored cells to mitigate problems between adjacent central terminals 10. As with FIG. 5A, the different type of hatch lines in FIG. 5B illustrate different frequency sets. As in FIG. 5A, FIG. 5B represents three frequency sets (e.g., where: FS1=F1, F4, F7, F10; FS2=F2, F5, F8, F11; FS3=F3, F6, F9, F12). However, in FIG. 5B the cells are sectored by using a sectored central terminal (SCT) 13 which includes three central terminals 10, one for each sector S1, S2 and S3, with the transmissions for each of the three central terminals 10 being directed to the appropriate sector among S1, S2 and S3. This enables the number of subscribers per cell to be increased three fold, while still providing permanent fixed access for each subscriber terminal 20.

A seven cell repeat pattern is used such that for a cell operating on a given frequency, all six adjacent cells operating on the same frequency are allowed unique PN codes. This prevents adjacent cells from inadvertently decoding data.

Figure 6:
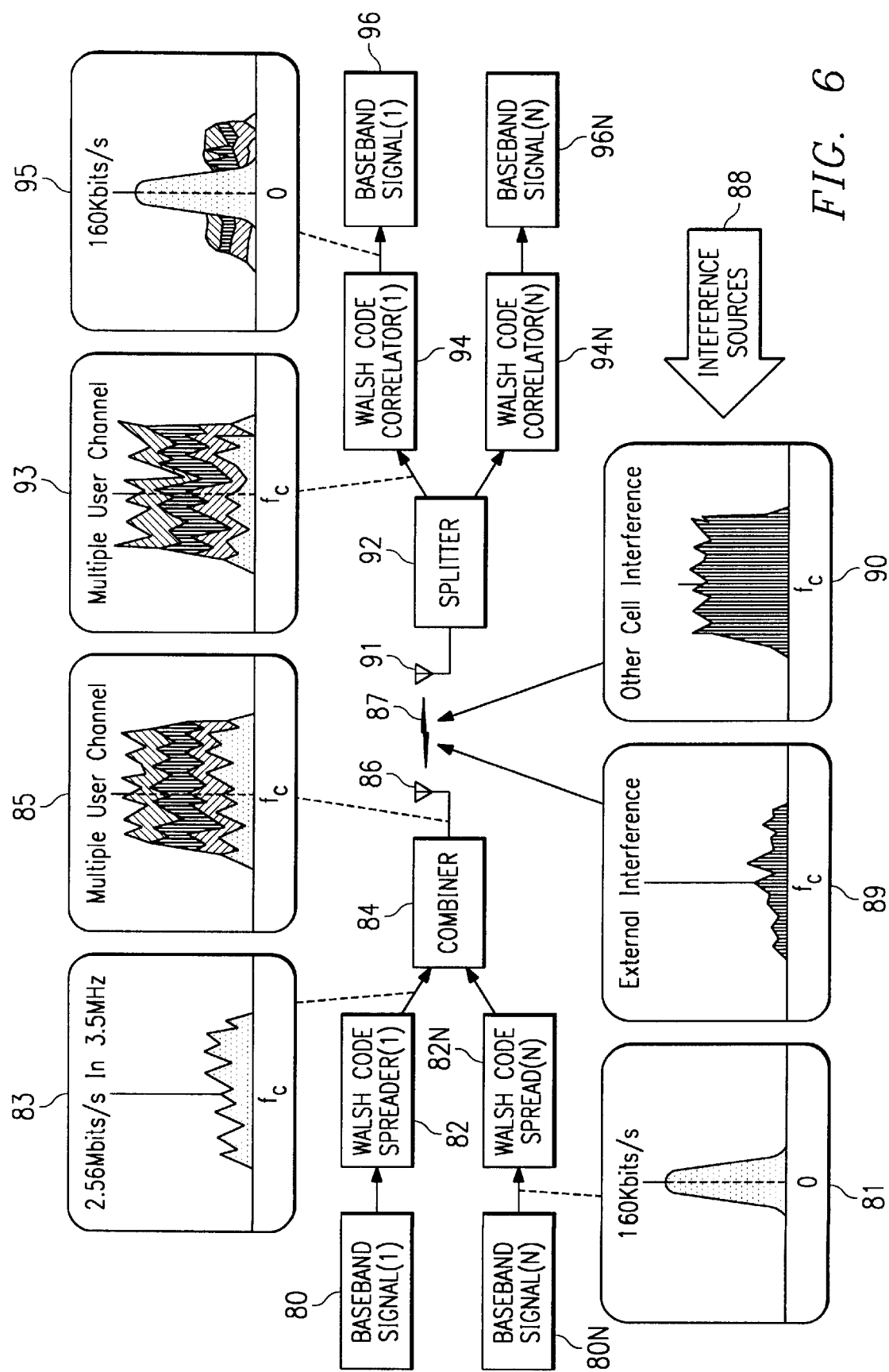
FIG. 6 is a schematic diagram illustrating aspects of a code division multiplex system for the telecommunications system of FIG. 1.

As mentioned above, each channel frequency can support 15 subscriber links. In this example, this is achieved using by multiplexing signals using a Code Division Multiplexed Access (CDMA) technique. FIG. 6 gives a schematic overview of CDMA encoding and decoding.

In order to encode a CDMA signal, base band signals, for example the user signals for each respective subscriber link, are encoded at 80–80N into a 160 ksymbols/sec baseband signal where each symbol represents 2 data bits (see, for example the signal represented at 81). This signal is then spread by a factor of 16 using a respective Walsh pseudo random noise (PN) code spreading function 82–82N to generate signals at an effective chip rate of 2.56 Msymbols/sec in 3.5 MHz. The signals for respective subscriber links are then combined and converted to radio frequency (RF) to give multiple user channel signals (e.g., 85) for transmission from the transmitting antenna 86.

During transmission, a transmitted signal will be subjected to interference sources 88, including external interference 89 and interference from other channels 90. Accordingly, by the time the CDMA signal is received at the receiving antenna 91, the multiple user channel signals may be distorted as is represented at 93.

In order to decode the signals for a given subscriber link from the received multiple user channel, a Walsh correlator 94–94 N uses the same pseudo random noise (PN) code that was used for the encoding for each subscriber link to extract a signal (e.g, as represented at 95) for the respective received baseband signal 96–96N. It will be noted that the received signal will include some residual noise. However, unwanted noise can be removed using a low pass filter and signal processing.

The key to CDMA is the application of orthogonal codes that allow the multiple user signals to be transmitted and received on the same frequency at the same time. Once the bit stream is orthogonally isolated using the Walsh codes, the signals for respective subscriber links do not interfere with each other.

Walsh codes are a mathematical set of sequences that have the function of "orthonormality". In other words, if any Walsh code is multiplied by any other Walsh code, the results are zero.

Figure 7:
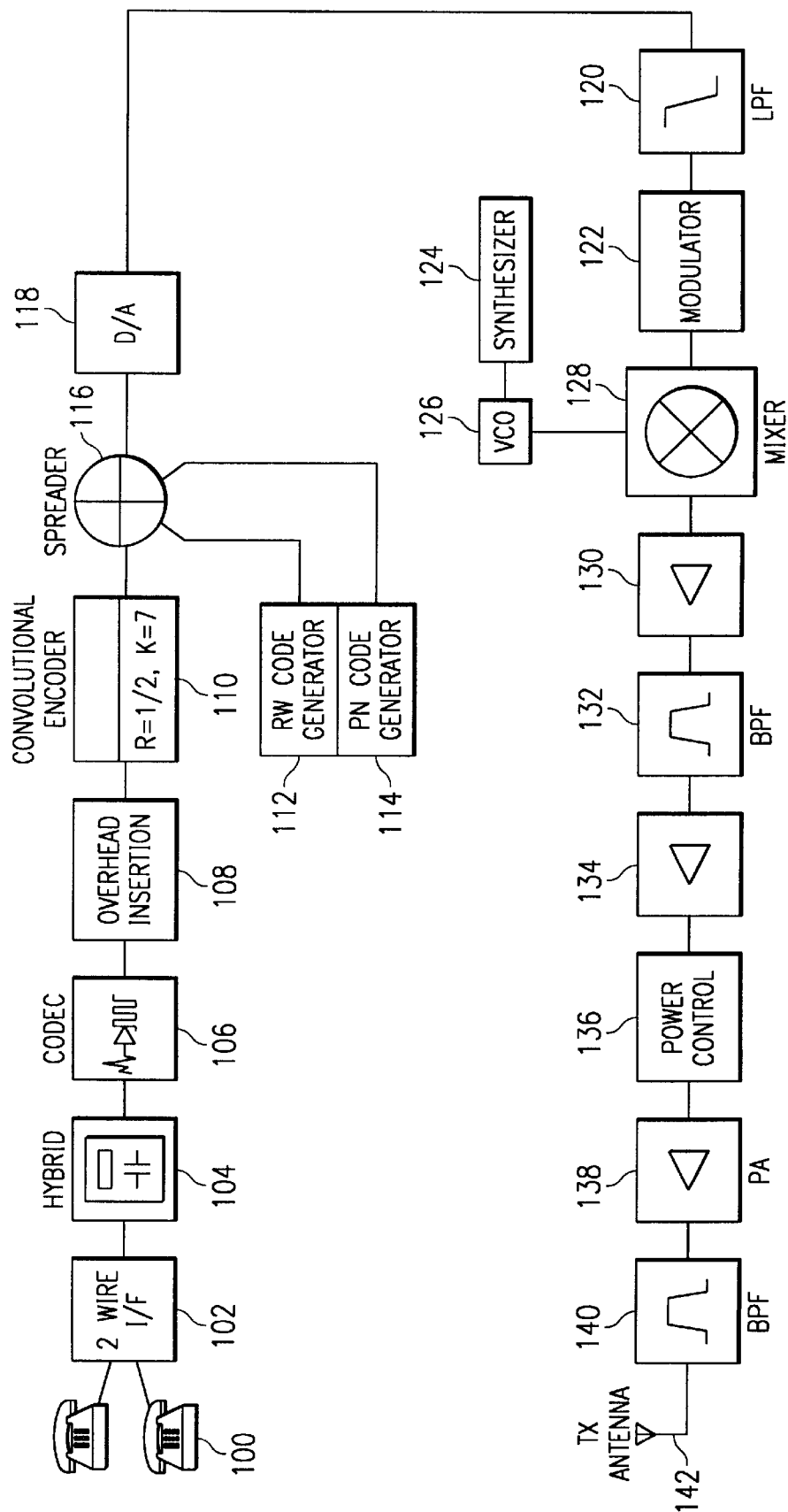
FIG. 7 is a schematic diagram illustrating signal transmission processing stages for the telecommunications system of FIG. 1.

FIG. 7 is a schematic diagram illustrating signal transmission processing stages as configured in a subscriber terminal 20 in the telecommunications system of FIG. 1. The central terminal is also configured to perform equivalent signal transmission processing. In FIG. 7, an analogue signal from one of a pair of telephones is passed via a two-wire interface 102 to a hybrid audio processing circuit 104 and then via a codec 106 to produce a digital signal into which an overhead channel including control information is inserted at 108. The resulting signal is processed by a convolutional encoder 110 before being passed to a spreader 116 to which the Rademacher-Walsh and PN codes are applied by a RW code generator 112 and PN Code generator 114, respectively. The resulting signals are passed via a digital to analogue converter 118. The digital to analogue converter 118 shapes the digital samples into an analogue waveform and provides a stage of baseband power control. The signals are then passed to a low pass filter 120 to be modulated in a modulator 122. The modulated signal from the modulator 122 is mixed with a signal generated by a voltage controlled oscillator 126 which is responsive to a synthesizer 160. The output of the mixer 128 is then amplified in a low noise amplifier 130 before being passed via a band pass filter 132. The output of the band pass filter 132 is further amplified in a further low noise amplifier 134, before being passed to power control circuitry 136. The output of the power control circuitry is further amplified in a further low noise amplifier 138 before being passed via a further band pass filter 140 and transmitted from the transmission antenna 142.

Figure 8:
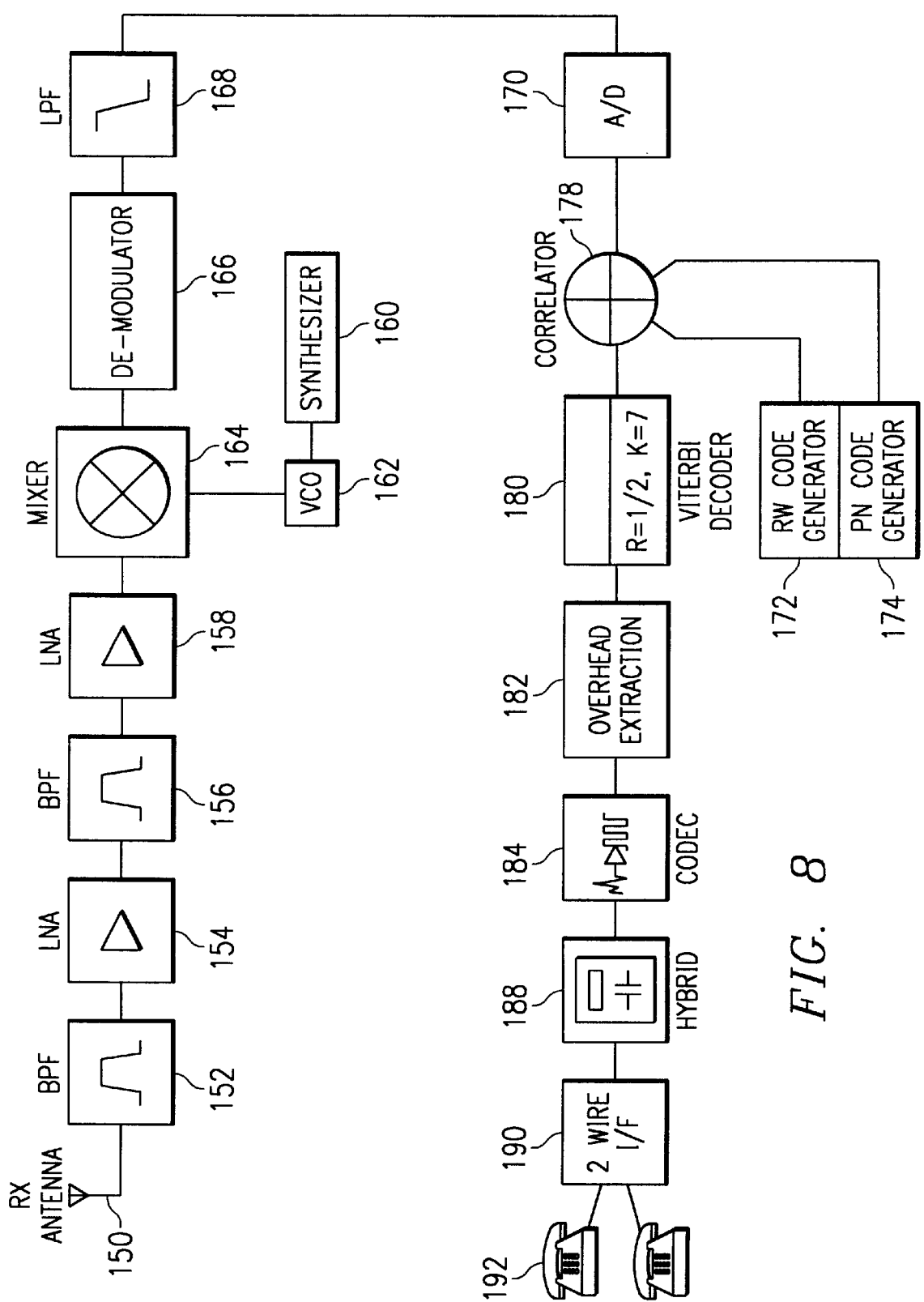
FIG. 8 is a schematic diagram illustrating signal reception processing stages for the telecommunications system of FIG. 1.

FIG. 8 is a schematic diagram illustrating the equivalent signal reception processing stages as configured in a subscriber terminal 20 in the telecommunications system of FIG. 1. The central terminal is also configured to perform equivalent signal reception processing. In FIG. 8, signals received at a receiving antenna 150 are passed via a band pass filter 152 before being amplified in a low noise amplifier 154. The output of the amplifier 154 is then passed via a further band pass filter 156 before being further amplified by a further low noise amplifier 158. The output of the amplifier 158 is then passed to a mixer 164 where it is mixed with a signal generated by a voltage controlled oscillator 162 which is responsive to a synthesizer 160. The output of the mixer 164 is then passed via the de-modulator 166 and a low pass filter 168 before being passed to an analogue to digital converter 170. The digital output of the A/D converter 170 is then passed to a correlator 178, to which the same Rademacher-Walsh and PN codes used during transmission are applied by a RW code generator 172 (corresponding to the RW code generator 112) and a PN code generator 174 (corresponding to PN code generator 114), respectively. The output of the correlator is applied to a Viterbi decoder 180. The output of the Viterbi decoder 180 is then passed to an overhead extractor 182 for extracting the overhead channel information. The output of the overhead extractor 182 is then passed via a codec 184 and a hybrid circuit 188 to a two wire interface 190 where the resulting analogue signals are passed to a selected telephone 192.

At the subscriber terminal 20, a stage of automatic gain control is incorporated at the IF stage. The control signal is derived from the digital portion of the CDMA receiver using the output of a signal quality estimator to be described later.

Figure 9:
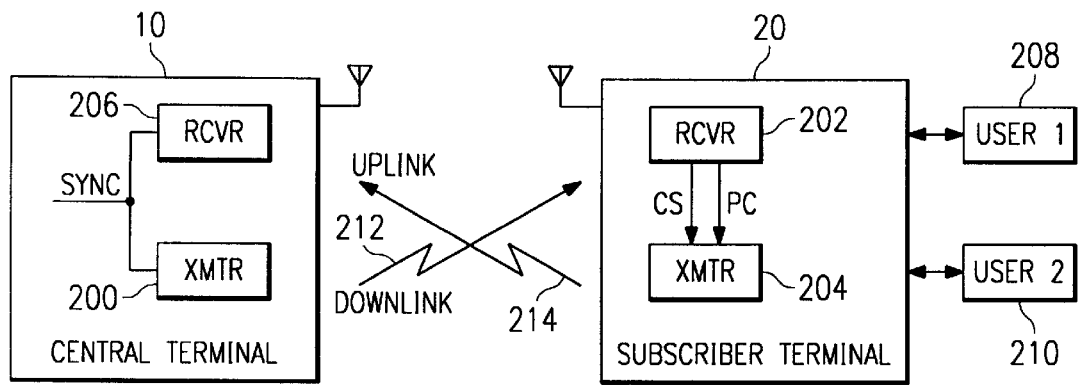
FIG. 9 is a schematic diagram illustrating downlink and uplink communication paths for the wireless telecommunications system.

FIG. 9 is a block diagram of downlink and uplink communication paths between central terminal 10 and subscriber terminal 20. A downlink communication path is established from transmitter 200 in central terminal 10 to receiver 202 in subscriber terminal 20. An uplink communication path is established from transmitter 204 in subscriber terminal 20 to receiver 206 in central terminal 10. Once the downlink and the uplink communication paths have been established in wireless telecommunication system 1, telephone communication may occur between a first user 208 or a second user 210 of subscriber terminal 20 and a user serviced through central terminal 10 over a downlink signal 212 and an uplink signal 214. Downlink signal 212 is transmitted by transmitter 200 of central terminal 10 and received by receiver 202 of subscriber terminal 20. Uplink signal 214 is transmitted by transmitter 204 of subscriber terminal 20 and received by receiver 206 of central terminal 10. Downlink signal 212 and uplink signal 214 are transmitted as CDMA spread spectrum signals.

Figure 10:
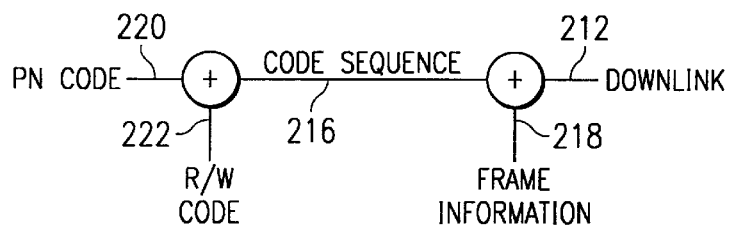
FIG. 10 is a schematic diagram illustrating the makeup of a downlink signal transmitted by the central terminal.

Receiver 206 and transmitter 200 within central terminal 10 are synchronized to each other with respect to time and phase, and aligned as to information boundaries. In order to establish the downlink communication path, receiver 202 in subscriber terminal 20 should be synchronized to transmitter 200 in central terminal 10. Synchronization occurs by performing an acquisition mode function and a tracking mode function on downlink signal 212. Initially, transmitter 200 of central terminal 10 transmits downlink signal 212. FIG. 10 shows the contents of downlink signal 212. Downlink signal 212 includes a code sequence signal 216 for central terminal 10 combined with a frame information signal 218. Code sequence signal 216 is derived from a combination of a pseudo-random noise code signal 220 and a Rademacher-Walsh code signal 222. Although FIG. 10 relates specifically to the makeup of the downlink signal, the uplink has the same makeup.

Each receiver 202 of every subscriber terminal 20 serviced by a single central terminal 10 operate off of the same pseudo-random noise code signal as central terminal 10. Each modem shelf 46 in central terminal 10 supports one radio frequency channel and fifteen subscriber terminals 20, each subscriber terminal having a first user 208 and a second user 210. Each modem shelf 46 selects one of sixteen Rademacher-Walsh code signals 222, each Rademacher-Walsh code signal 222 corresponding to a unique subscriber terminal 20. Thus, a specific subscriber terminal 20 will have an identical code sequence signal 218 as downlink signal 212 transmitted by central terminal 10 and destined for the specific subscriber terminal 20.

Downlink signal 212 is received at receiver 202 of subscriber terminal 20. Receiver 202 compares its phase and code sequence to a phase and code sequence within code sequence signal 216 of downlink signal 212. Central terminal 10 is considered to have a master code sequence and subscriber terminal 20 is considered to have a slave code sequence. Receiver 202 incrementally adjusts the phase of its slave code sequence to recognize a match to master code sequence and place receiver 202 of subscriber terminal 20 in phase with transmitter 200 of central terminal 10. The slave code sequence of receiver 202 is not initially synchronized to the master code sequence of transmitter 200 and central terminal 10 due to the path delay between central terminal 10 and subscriber terminal 20. This path delay is caused by the geographical separation between subscriber terminal 20 and central terminal 10 and other environmental and technical factors affecting wireless transmission.

Figure 11:
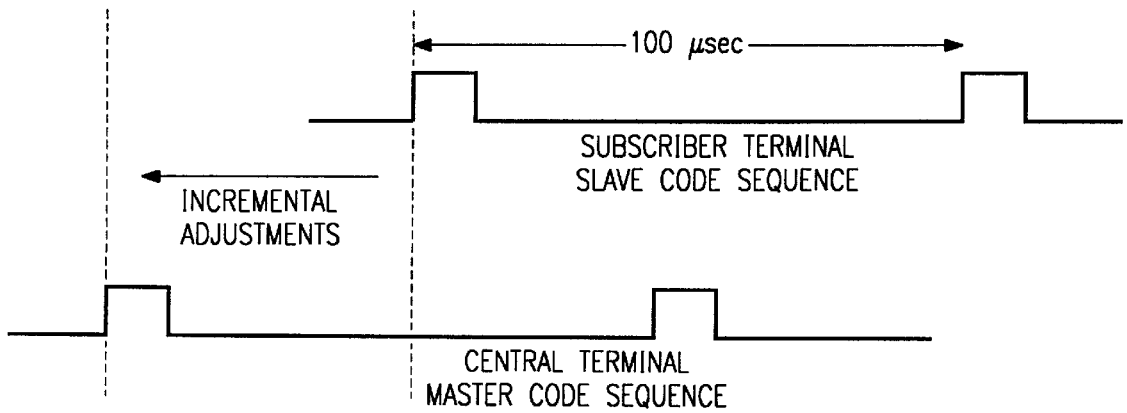
FIG. 11 is a graphical depiction illustrating the phase adjustment to a slave code sequence of the subscriber terminal.

FIG. 11 illustrates how receiver 202 of subscriber terminal 20 adjusts its slave code sequence to match the master code sequence of transmitter 200 in central terminal 10. Receiver 202 increments the phase of the slave code sequence throughout the entire length of the master code sequence within downlink signal 212 and determines a signal quality estimate by performing a power measurement on the combined power of the slave code sequence and the master code sequence for each incremental change in the phase of the slave code sequence. The length of the master code sequence is approximately 100 microseconds based on a chip period of 2.56 MegaHertz. The phase of the slave code sequence is adjusted by one half of a chip period for each incremental interval during the acquisition phase. Receiver 202 completes a first acquisition pass when it identifies a correlation peak where the combined power reaches a maximum value. Receiver 202 performs a second acquisition pass throughout the entire length of the code sequence to verify identification of the maximum value of the combined power at the correlation peak. The approximate path delay between subscriber terminal 20 and central terminal 10 is determined when the correlation peak position is identified in the acquisition mode.

Once acquisition of downlink signal 212 is achieved at receiver 202, fine adjustments are made to the phase of the slave code sequence in order to maintain the phase matching of the slave code sequence with the master code sequence in the tracking mode. Fine adjustments are made through one sixteenth of a chip period incremental changes to the phase of the slave code sequence. Fine adjustments may be performed in either forward (positive) or backward (negative) directions in response to the combined power measurements made by receiver 202. Receiver 202 continuously monitors the master code sequence to ensure that subscriber terminal 20 is synchronized to central terminal 10 for the downlink communication path.

Figure 12:
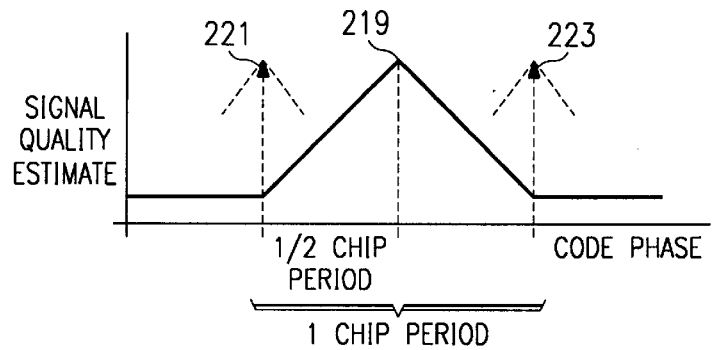
FIG. 12 is a graphical depiction of a signal quality estimate performed by the receiver in the subscriber terminal.

FIG. 12 shows a graph of the combined power curve measured by receiver 202 during the acquisition mode and the tracking mode. The maximum value of the combined power occurs at the correlation peak 219 of the combined power curve. It should be noted that the peak 219 may not be as well defined as in FIG. 12, but may be flattened at the top, more in the form of a plateau. This is the point where the slave code sequence of receiver 202 is in phase with and matches the master code sequence of transmitter 200. Measurements resulting in combined power values that occur off of correlation peak 219 require incremental adjustments to be made to the slave code sequence. A fine adjustment window is established between an early correlator point 221 and a late correlator point 223. An average power measurement is performed at early correlator point 221 and at late correlator point 223. Since early correlator point 221 and late correlator point 223 are spaced one chip period apart, an error signal is produced upon calculating the difference between the average powers of early correlator point 221 and late correlator point 223 that is used to control the fine adjustments to the phase of the slave code sequence.

After acquiring and initiating tracking on the central terminal 10 master code sequence of code sequence signal 216 within downlink signal 212, receiver 202 enters a frame alignment mode in order to establish the downlink communication path. Receiver 202 analyzes frame information within frame information signal 218 of downlink signal 212 to identify a beginning of frame position for downlink signal 212. Since receiver 202 does not know at what point in the data stream of downlink signal 212 it has received information, receiver 202 must search for the beginning of frame position in order to be able to process information received from transmitter 200 of central terminal 10. Once receiver 202 has identified one further beginning of frame position, the downlink communication path has been established from transmitter 200 of central terminal 10 to receiver 202 of subscriber terminal 20.

Figure 13:
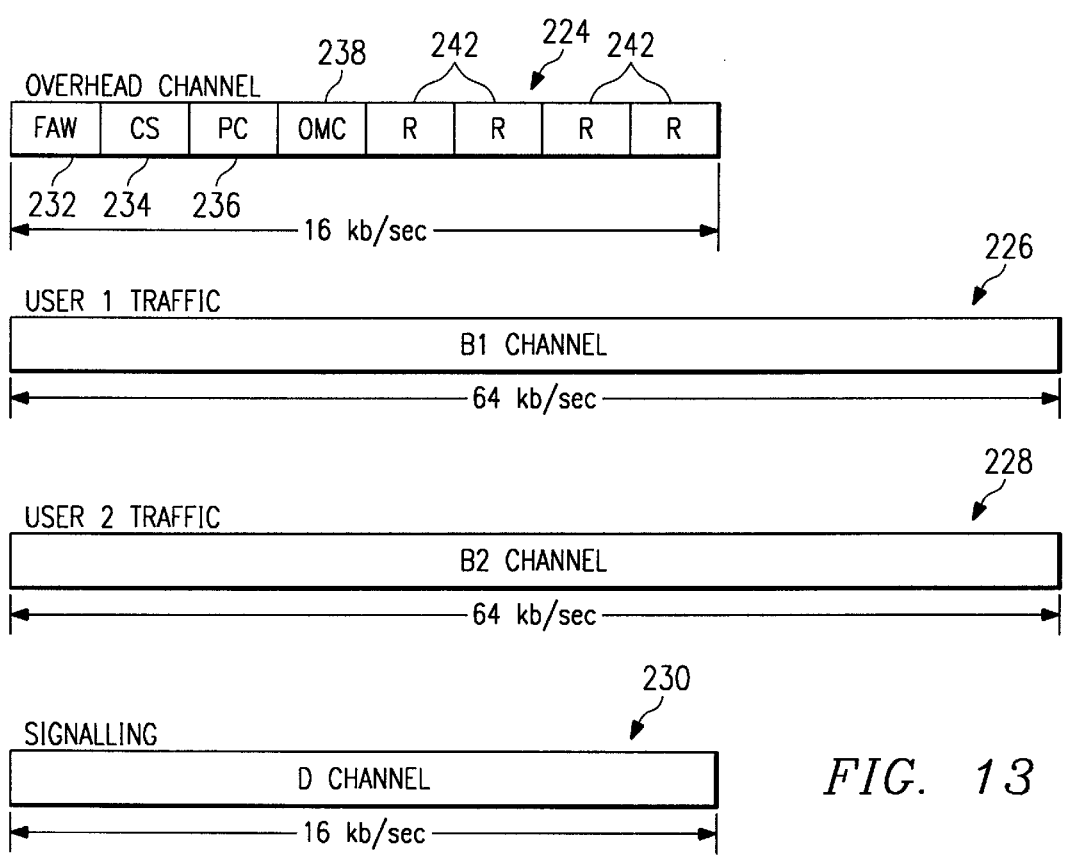
FIG. 13 is a graphical diagram illustrating the contents of a frame information signal within the downlink signal.

FIG. 13 shows the general contents of frame information signal 218. Frame information signal 218 includes an overhead channel 224, a first user channel 226, a second user channel 228, and a signaling channel 230 for each frame of information transported over downlink signal 212. Overhead channel 224 carries control information used to establish and maintain the downlink and uplink communication paths. First user channel 226 is used to transfer traffic information to first user 208. Second user channel 228 is used to transfer traffic information to second user 210. Signaling channel 230 provides the signaling information to supervise operation of subscriber terminal 20 telephony functions. Overhead channel 224 occupies 16 kilobits per second of a frame of information, first user channel 226 occupies 64 kilobits per second of a frame of information, second user channel 228 occupies 64 kilobits per second of a frame of information, and signaling channel 230 occupies 16 kilobits per second of a frame of information.

Figure 14:
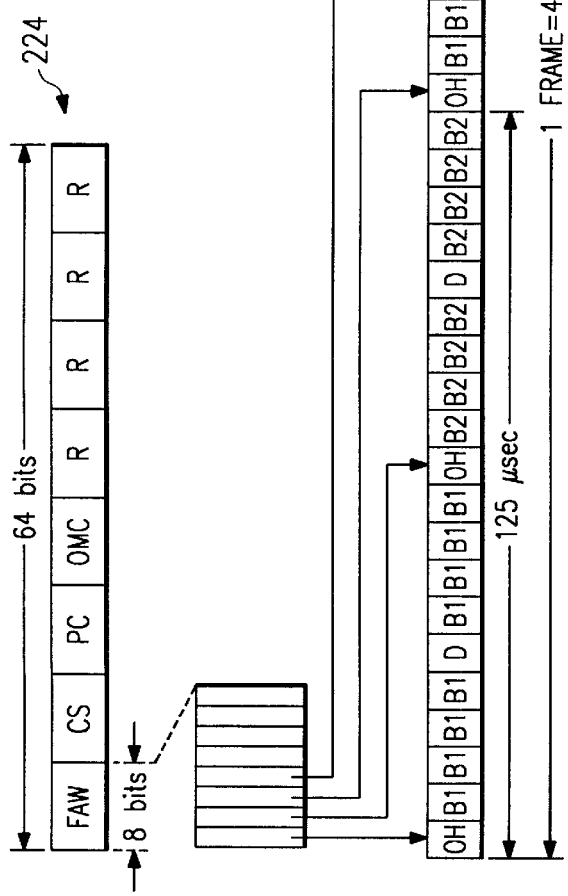
FIG. 14 is a tabular depiction illustrating overhead insertion into a data stream of the downlink signal.

FIG. 14 shows how overhead channel 224 is inserted into the data stream of downlink signal 212. The data stream of downlink signal 212 is partitioned into twenty bit subframes. Each twenty bit subframe has two ten bit sections. A first ten bit section includes an overhead bit, a signaling bit, and eight first user bits. A second ten bit section includes an overhead bit, a signaling bit, and eight second user bits. This twenty bit subframe format is repeated throughout an entire four millisecond frame of information. Thus, an overhead bit occupies every tenth bit position of frame information in the data stream of downlink signal 212.

Overhead channel 224 includes eight byte fields—a frame alignment word 232, a code synchronization signal 234, a power control signal 236, an operations and maintenance channel signal 238, and four reserved byte fields 242. Frame alignment word 232 identifies the beginning of frame position for its corresponding frame of information. Code synchronization signal 234 provides information to control synchronization of transmitter 204 in subscriber terminal 20 to receiver 206 in central terminal 10. Power control signal 236 provides information to control transmitting power of transmitter 204 in subscriber terminal 20. Operations and maintenance channel signal 238 provides status information with respect to the downlink and uplink communication paths and a path from the central terminal to the subscriber terminal on which the communication protocol which operates on the modem shelf between the shelf controller and the modem cards also extends.

In order to identify two successive beginning of frame positions, receiver 202 of subscriber terminal 20 searches through the ten possible bit positions in the data stream of downlink signal 212 for overhead channel 224 and frame alignment word 232. Receiver 202 initially extracts a first bit position of every ten bit section of frame information to determine if overhead channel 224 has been captured. If frame alignment word 232 has not been identified after a predetermined period of time from the extraction of the first bit position, receiver 202 will repeat this procedure for the second bit position of each ten bit section and subsequent bit positions until frame alignment word 232 has been identified. An example of a frame alignment word 232 which receiver 202 would search for is binary 00010111. Once the correct bit position yields frame alignment word 232, receiver 202 attempts to identify two successive beginning of frame positions. A downlink communication path is established upon the successful identification of two successive beginning of frame positions in response to recognition of successive frame alignment words 232 in the data stream of downlink signal 212.

Receiver 202 continues to monitor the appropriate bit position in order to recognize subsequent frame alignment words 232 for subsequent frames of information. If receiver 202 fails to recognize a frame alignment word 232 for three successive frames, then receiver 202 will return to the search process and cycle through each of the bit positions of the ten bit section until identifying two successive beginning of frame positions through recognition of two successive frame alignment words 232 and reestablishing frame alignment. Failure to recognize three successive frame alignment words 232 may result from a change in the path delay between central terminal 10 and subscriber terminal 20. Receiver 202 will also return to the search process upon an interruption in the downlink communication path from transmitter 200 in central terminal 10 to receiver 202 in subscriber terminal 20.

Acquisition of a downlink communication path may also be verified to ensure that a subscriber terminal 20 is locked on to the appropriate portion of an appropriate modem card 70. Situations may arise where a modem card 70 assigned to a particular subscriber terminal 20 may be out of service for any of a number of reasons. The particular subscriber terminal 70 may continue to attempt to acquire a signal and such acquisition may occur with respect to a signal from one of the other modem cards 70 within the central terminal 10. Though the particular subscriber terminal 20 should not be able to read signals from other modem cards 70, the particular subscriber terminal 20 is still locked to another modem card 70 and will not lock to the appropriate modem card when it comes back into service. Therefore, an acquisition verification technique is used to ensure that the particular subscriber terminal 20 does not lock onto a non-associated modem card 70 in central terminal 10.

The acquisition verification technique uses the reserved byte fields 242 in overhead channel 224. A channel identifier field occupies one of reserved byte fields 242. The channel identifier field includes eight bits—an inversion bit, a three bit pseudo random noise code identifier, and a four bit Rademacher-Walsh code identifier, in the form of INV P P P R R R R. The three bit pseudo random noise code identifier corresponds to the sequence associated with central terminal 10 and its associated subscriber terminals 20. The four bit Rademacher-Walsh code identifier corresponds to the specific code associated with one of fifteen subscriber terminals 20. The channel identifier field prevents a subscriber terminal 20 from establishing communications with an incorrect central terminal 10 and also prevents a subscriber terminal 20 from establishing communications with an incorrect modem card 70 in a correct central terminal 10.

Receiver 202 in establishing a downlink communication path through identification of two successive frame alignment words 232 also monitors the channel identifier field within overhead channel 224. Though a frame alignment may occur, the downlink communication path will not be established unless an appropriate match occurs on the channel identifier field. Since the pseudo random noise code identifier and the Rademacher-Walsh code identifier are constant for each subscriber terminal 20, receiver 202 should avoid confusing a channel identifier field with a frame alignment word. The inversion bit changes state at each frame of information along with the first and third bits of the pseudo random noise code identifier and the first and third bits of the Rademacher-Walsh code identifier within the channel identifier field as shown by italics above. This prevents the channel identifier field from being recognized as the frame alignment word.

Upon establishing the downlink communication path from central terminal 10 to subscriber terminal 20 through proper code sequence phase synchronization and frame alignment, wireless telecommunication system 1 performs procedures to establish the uplink communication path from transmitter 204 in subscriber terminal 20 to receiver 206 in central terminal 10. Initially, transmitter 204 is powered off until the downlink communication path has been established to prevent transmitter interference of central terminal communications with other subscriber terminals. After the downlink communication path is established, transmitting power of transmitter 204 is set to a minimum value on command from the central terminal CT via power control channel 236 of overhead channel 224. Power control signal 236 controls the amount of transmitting power produced by transmitter 204 such that central terminal 10 receives approximately the same level of transmitting power from each subscriber terminal 20 serviced by central terminal 10.

Power control signal 236 is transmitted by transmitter 200 of central terminal 10 in overhead channel 224 of frame information signal 218 over downlink signal 212. Receiver 202 of subscriber terminal 20 receives downlink signal 212 and extracts power control signal 236 therefrom. Power control signal 236 is provided to transmitter 204 of subscriber terminal 20 and incrementally adjusts the transmitting power of transmitter 204. Central terminal 10 continues to incrementally adjust the transmitting power of transmitter 204 until the transmitting power falls within a desired threshold range as determined by receiver 206. Adjustments to the transmitting power initially occur in a coarse adjustment mode having one decibel increments until the transmitting power falls within the desired threshold range. Upon turning transmitter 204 on, the transmitting power is gradually ramped up in intensity through incremental adjustments in order to avoid interference of central terminal communications with other subscriber terminals.

FIG. 15 shows an example decoding scheme for power control signal 236. After the transmitting power of transmitter 204 in subscriber terminal 20 reaches the desired threshold range, receiver 206 in central terminal 10 continues to monitor the amount of transmitting power from transmitter 204 for any changes resulting from power fluctuations, and variations in the path delay between central terminal 10 and subscriber terminal 20, et al. If the transmitting power falls below or exceeds the desired threshold range, central terminal 10 will send an appropriate power control signal 236 to increase or decrease the transmitting power of transmitter 204 as needed. At this point, adjustments made to return the transmitting power to the desired threshold range may occur in a fine adjustment mode having 0.1 decibel increments. Upon an interruption in the downlink or uplink communication paths, central terminal 10 may command transmitter 204 to return to a previous transmitting power level through recovery of parameters stored in a memory in subscriber terminal 20 in order to facilitate reestablishment of the appropriate communication path.

To fully establish the uplink communication path from subscriber terminal 20 to central terminal 10, transmitter 204 in subscriber terminal 20 should be synchronized to receiver 206 in central terminal 10. Central terminal 10 controls the synchronization of transmitter 204 through code synchronization signal 234 in overhead channel 224 of frame information signal 218. Code synchronization signal 234 incrementally adjusts a phase of the slave code sequence of transmitter 204 to match the phase of the master code sequence of receiver 206. Synchronization of transmitter 204 is performed in a substantially similar manner as synchronization of receiver 202.

Code synchronization signal 234 is transmitted by transmitter 200 in central terminal 10 in overhead channel 224 of frame information signal 218 over downlink signal 212. Receiver 202 of subscriber terminal 20 receives downlink signal 212 and extracts code synchronization signal 234 therefrom. Code synchronization signal 234 is provided to transmitter 204 for incrementally adjustment of the phase of the slave code sequence of transmitter 204. Central terminal 10 continues to incrementally adjust the phase of the slave code sequence of transmitter 204 until receiver 206 recognizes a code and phase match between the slave code sequence of transmitter 204 and the master code sequence of central terminal 10.

Receiver 206 performs the same power measurement technique in determining a phase and code match for transmitter 204 synchronization as performed for receiver 202 synchronization. Adjustments to the phase of the slave code sequence of transmitter 204 initially occur in a coarse adjustment mode having one half of a chip rate increments until receiver 206 identifies the maximum power position of the combined power of the master code sequence and the slave code sequence of transmitter 204.

FIG. 16 shows an example decoding scheme for code synchronization signal 234. After identification and verification of a phase and code match of the slave code sequence to the master code sequence, receiver 206 continues to monitor uplink signal 214 for changes in the phase of the slave code sequence of transmitter 204 resulting from variations in the path delay between central terminal 10 and subscriber terminal 20. If further adjustments are needed to the phase of the slave code sequence of transmitter 204, central terminal 10 will send appropriate code synchronization signals 234 to increase or decrease the phase of the slave code sequence of transmitter 204 as needed. At this point, adjustments made to the phase of the slave code sequence of transmitter 204 may occur in a fine adjustment mode having one sixteenth of a chip rate increments. Upon an interruption in the downlink or uplink communication paths, central terminal 10 may command transmitter 204 to return to a previous slave code sequence phase value through recovery of parameters stored in a memory in subscriber terminal 20 in order to facilitate reestablishment of the appropriate communication path.

After synchronization of transmitter 204 is achieved, receiver 206 performs frame alignment on uplink signal 214 in a similar manner as frame alignment is performed by receiver 202 during establishment of the downlink communication path. Once receiver 206 recognizes two successive frame alignment words and obtains frame alignment, the uplink communication path has been established. Upon establishing both the downlink and the uplink communication paths, information transfer between first user 208 or second user 210 of subscriber terminal 20 and users coupled to central terminal 10 may commence.

Wireless telecommunication system 1 is capable of adjusting the transmitting power level and the transmit rate to one of two settings for each of three different system operating modes. The system operating modes are acquisition, standby and traffic. Adjustments in the transmitting power and the transmit rate make it possible to reduce and minimize interference with other subscriber terminals. Improvements in link establishment time are also achieved. The transmitting power level is decoded in power control signal 236 and the transmit rate is decoded in code synchronization signal 234.

The transmitting power for both downlink signal 212 and uplink signal 214 can be set to either a nominal 0 decibel high power level or a reduced −12 decibel low power level. The transmit rate for both downlink signal 212 and uplink signal 214 can be set to a low rate of 10 kilobits per second or a high rate of 160 kilobits per second. When switched to the high rate of 160 kilobits per second, user traffic and overhead information are spread such that one information symbol results in the transmission of 16 chips. Correlation is performed over 16 chips, yielding a processing gain of 12 decibels. When switched to the low rate of 10 kilobits per second, only overhead information is spread such that one overhead symbol results in the transmission of 256 chips. Correlation is performed over 256 chips, yielding a processing gain of 24 decibels.

Figure 17:
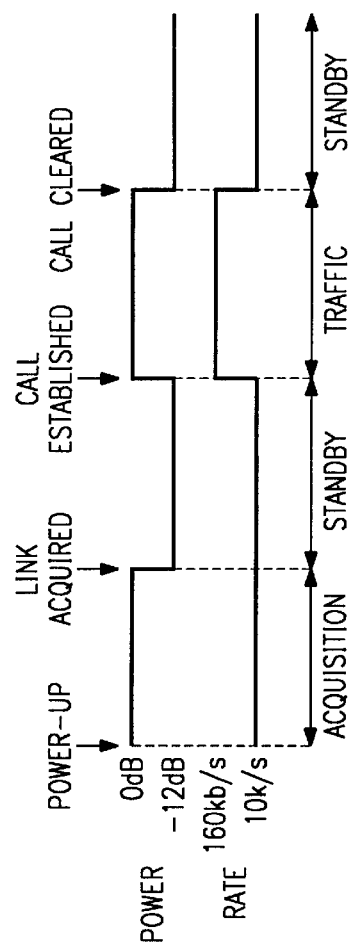
FIG. 17 is a graphical depiction of a transmitting power and a transmit rate for each mode of operation of the wireless telecommunications system.

FIG. 17 show the transmitting power and transmit rate for each of the three system operating modes. At power up or whenever the downlink or uplink communication paths are lost, wireless telecommunication system 1 enters the acquisition mode. During the acquisition mode, the transmitting power of the downlink and uplink transmitters are maximized as well as the correlator processing gain. This maximizes the signal to noise ratio at the correlator output, increasing the amplitude of the correlation peak 219 for easier identification and minimal risk of false acquisition. Since only overhead information is needed in the acquisition mode, the transmit rate is at the low rate level of 10 kilobits per second.

When the downlink and the uplink communication paths are acquired, wireless telecommunication system 1 enters the standby mode. In the standby mode, the transmitting power of the downlink and uplink transmitters are reduced by 12 decibels. This reduction in transmitting power minimizes the interference to other subscriber terminals while still maintaining synchronization. The transmit rate remains at the low rate level to allow exchange of control information between central terminal 10 and subscriber terminal 20 over overhead channel 224.

When either an incoming or outgoing call is detected, a message is sent from the originating terminal to the destination terminal indicating that the downlink and uplink communication paths are required for the transmission of user traffic information. At this point, wireless telecommunication system 1 enters into the traffic mode. During the traffic mode, the transmitting power of both the downlink and uplink communication paths is increased to the high power level and the transmit rate is increased to the high rate level of 160 kilobits per second to facilitate information transfer between originating and destination terminals. Upon detection of call termination, a message is sent from the terminating terminal to the other terminal indicating that the downlink and uplink communication paths are no longer required. At this point, wireless telecommunication system 1 reenters the standby mode. Code synchronization and frame alignment tracking is performed in both the standby mode and the traffic mode.

Figure 18:
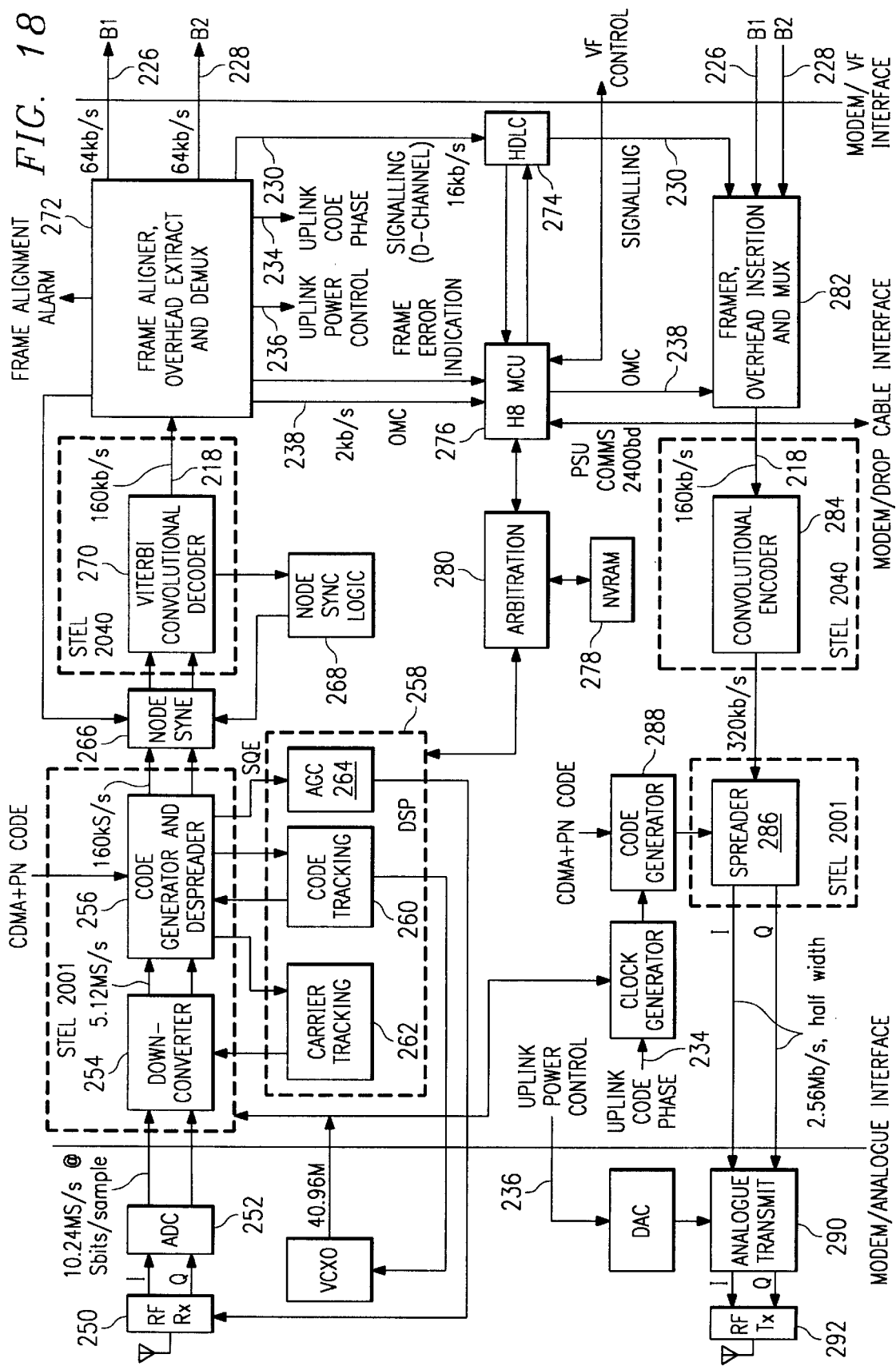
FIG. 18 is a schematic diagram illustrating the operation of the receiver and transmitter in the subscriber terminal.

FIG. 18 is a detailed block diagram of receiver 202 and transmitter 204 in subscriber terminal 20. Receiver 202 receives downlink signal 212 at an RF receive interface 250.

RF receive interface 250 separates the spread spectrum signal into I and Q signal components. RF receive interface 250 band pass filters each of the I and Q signal components by removing portions above approximately half of receiver 202 bandwidth of 3.5 MegaHertz. RF receive interface 250 low pass filters the I and Q signal components to reject image frequencies and prevent signal aliasing. The I and Q signal components are placed into digital format by an analog to digital converter 252. The sampling frequency of analog to digital converter 252 is four times the chip period, or 10.24 MegaHertz, with an eight bit resolution.

The digital I and Q signal components are stepped to a rate of 5.12 MegaHertz by a down converter 254. A code generator and despreader 256 performs the synchronization acquisition and tracking functions previously described to synchronize the phase of the Rademacher-Walsh and pseudo-random noise code sequence of receiver 202 to that of downlink signal 212. A digital signal processor 258 controls the phase of the slave code sequence through a code tracker 260 and a carrier tracker 262. An automatic gain control unit 264 produces an automatic gain control signal to control the gain of RF receive interface 250. Code generator and despreader 256 generates the I and Q 160 kilobits per second of frame information for further synchronization by a node sync interface 266 under the control of a node sync logic unit 268. Node sync interface 266, through node sync logic unit 268, determines whether the I and Q channels should be swapped, as they may be received in four different ways.

Viterbi decoder 270 provides forward error correction on the I and Q channels and generates an error corrected 160 kilobits per second data signal after a 71 symbol delay. The error corrected signal is processed by a frame aligner and extractor 272 determines frame alignment and extracts power control signal 236, code synchronization 234, and operations and maintenance channel signal 238. Frame aligner and extractor 272 also extracts first user channel 226 and second user channel 228 for traffic transmission towards first user 208 an second user 210, and signaling channel 230 for processing by high level data link controller 274 and a microcontroller 276. Frame aligner and extractor 272 also provides alarm and error indications upon detecting a loss in frame alignment. A non-volatile random access memory 278 stores system parameter information for subsequent insertion through an arbitrator 280 in the event of link loss in order to facilitate link reestablishment. Arbitrator 280 also provides an interface between digital signal processor 258 and microcontroller 276.

In the transmit direction, a frame inserter 282 receives first user traffic and second user traffic from first user 208 and second user 210, signaling channel 230 information from high level data link controller 274, and operations and maintenance channel 238 information from microcontroller 276. Frame inserter generates frame information signal 218 for uplink signal 214 for processing by a convolutional encoder 284. Convolutional encoder 284 doubles the data rate of frame information signal 218 to provide forward error correction. A spreader 286 splits the 320 kilobits per second signal of convolutional encoder 284 into two 160 kilobits per second I and Q signals and exclusively ORs these signals with the spreading sequence generated by a code generator 288 in response to a system clock generated by clock generator 290 as adjusted by code synchronization signal 234. Code generator 288 generates one of sixteen Rademacher-Walsh functions exclusive ORed with a pseudo-random sequence having a pattern length of 256 with a chip rate of 2.56 MegaHertz. The pseudo-random sequence should match that of central terminal 10, but is adjustable under software control to provide reliable rejection of signals from other bands or other cells.

Spreader 286 supplies the I and Q signals to an analog transmitter 290. Analog transmitter 290 produces pulsed I and Q signals for an RF transmit interface 292. Transmit power is generated by first establishing a control voltage from a digital to analog converter in response to power control signal 236 extracted from overhead channel 224. This control voltage is applied to the power control inputs of analog transmitter 290 and RF transmit interface 292. Power control of 35 decibels is obtainable in both analog transmitter 290 and RF transmit interface 292. RF transmit interface 292 includes a step attenuator that provides 2 decibel steps of attenuation over a 30 decibel range. This attenuator is used to switch between high and low power levels. On power up, maximum attenuation is selected to minimize the transmitting power of transmitter 204.

Figure 19:
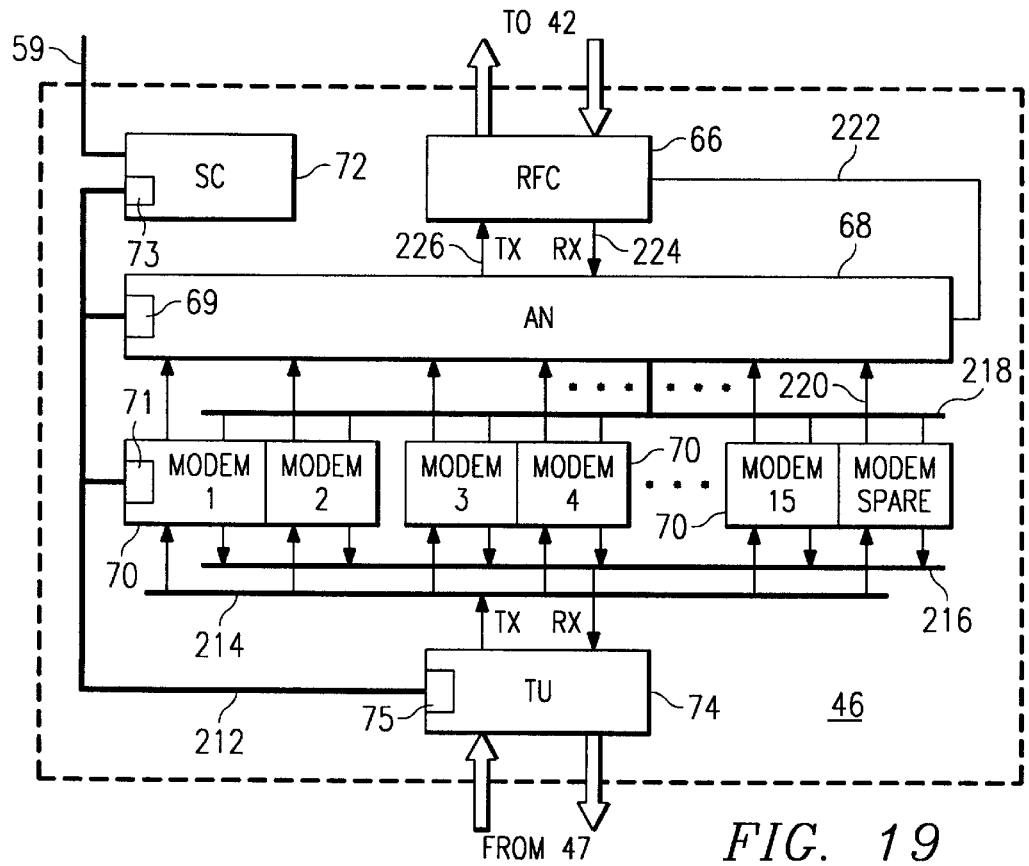
FIG. 19 is a schematic diagram illustrating in more detail the configuration of the modem shelf of FIG. 3A.

FIG. 19 is a schematic diagram illustrating in more detail the configuration of one of the modem shelves 46. The shelf controller 72 manages the operation of the whole of the modem shelf and its daughter network sub-elements (NSEs). The shelf controller (SC) 72 is provided with a RS232 serial port 59 for connection to a site controller or to a pad for connection to a data network such as an X.25 data network. The shelf controller communicates control and data information via a backplane asynchronous bus 212 directly with the analogue card (AN) 68, the tributary unit card (TU) 74 and the modem cards (MC) 70. Other network sub-elements are connected via the modem cards. In a fully populated rack there will be four shelf controllers, one on each modem shelf. These four shelf controllers are configured to share the control of network service elements on other cards in the rack. The network service elements on the RF combiner shelf 42 are connected to the shelf controller backplane bus on each of the modem shelves. The shelf controller includes a master communications interface 73 for performing the communications functions mentioned above and other control functions. Each of the tributary card 74, the analogue card 68 and each modem card 70 includes a respective slave communications interface 74, 69 and 71, which manages the communications with the shelf controller 72. The RF card 66 is controlled from the analogue card 68, which is configured to provide the necessary control functions via the control path 222.

Also shown in FIG. 19 are the signal paths from an interface to the public switched telephone network (e.g via lines 47 in FIG. 3) and the interface to an RF combiner shelf 42.

The tributary unit 74 terminates the connection to the host public switched telephone network and handles the processing of telephony information for up to 15 subscriber terminals (up to 30 calls). The tributary unit 74 is 'on-line' in that it directly processes calls. The tributary unit 74 is also connected to a 2 Mb/s time-multiplexed (timeslot) transmit bus 214 and 2 Mb/s time-multiplexed (timeslot) receive bus 216 for transmit and receive calls, respectively.

The modems (1–15) on the modem cards 70 perform baseband signal processing of the transmit and receive signals including the convolution coding and spreading functions on the transmit signals, and the synchronization recovery, de-spreading and error correction functions on the receive signals, as described earlier. Each modem is connected to the tributary unit 74 via the transmit and receive buses 214 and 216, and to the analogue card 68 via a dedicated connection 220 to one of a number of ports on the analogue card and via a digital CDMA RCV bus 218. Each of these dedicated connections includes multiplexed I, Q and control transmit paths.

The analogue card 68 performs A-D/D-A conversions, baseband filtering and vector summation of the 15 transmit signals from the modem cards. The analogue card 68 also scales the transmit signal power level according to high or low power levels. It is connected to the modem cards via the dedicated connections 220 and the digital CDMA RCV bus 218.

The RF card 66 generates the modulated transmit RF signals (at medium power level) and recovers and amplifies the baseband RF signal from the subscriber terminals 20. The RF card is 'on-line' in that it passes up to 30 calls simultaneously via the 15 available links, all on the same RF carrier. The RF card is connected to the analogue card via transmit and receive paths 226 and 224, respectively. The RF card is also connected to power amplifiers of the RF combiner shelf on the transmit side and to a low noise amplifier on the receive side. The power amplifiers (not shown) in the RF combiner shelf amplify the medium power output of the RF card 66 to an appropriate transmit power plus an amount to cover losses during signal combination and in the antenna feeder cable for the transmit signal. The low noise amplifier (not shown) is a low signal amplifier for overcoming losses in the antenna feeder etc. for the receive signal. The transmit carrier modulation is performed by the RF card 66 using an 'IQ modulator' at intermediate frequency and a single conversion to RF. The receive output of the RF card is at baseband in 'IQ' format as per the transmit input to the RF card.

Figure 20:
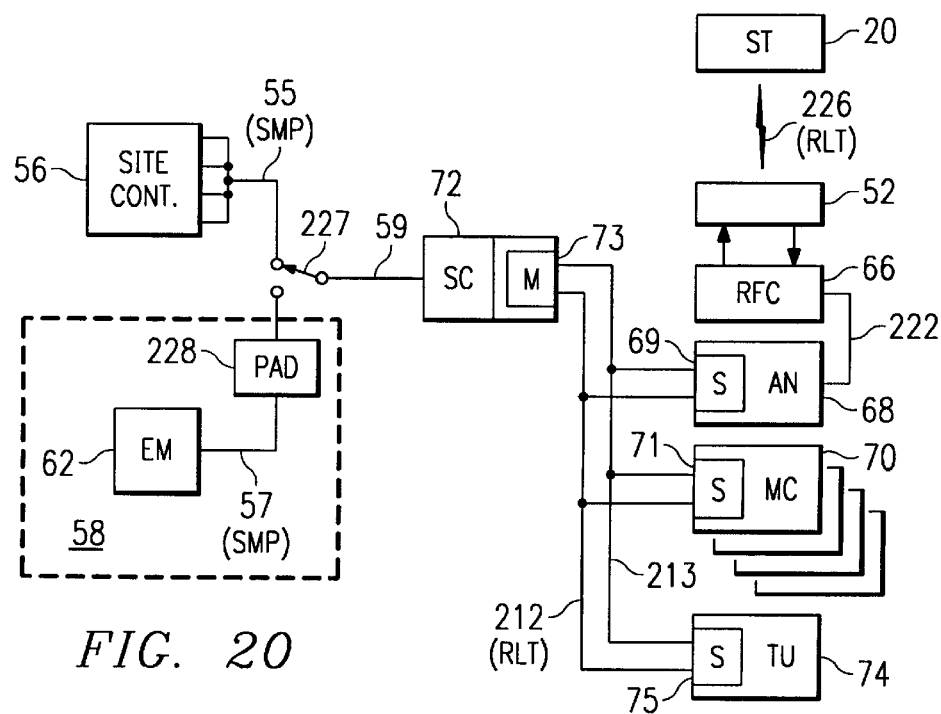
FIG. 20 is a schematic block diagram illustrating control protocols for the telecommunication system of FIG. 1.

FIG. 20 is a schematic block diagram illustrating an example of various control protocols used for the transmission of control information between different parts of an example of a telecommunications system in accordance with the invention. It should be noted that FIG. 20 is directed to the control signal paths, and accordingly, the telephone call signal paths are not included. Many of the features of FIG. 20 have already been described above, and in this case the same reference numerals are used as before. Accordingly, these features will not be described again in detail.

A first protocol, called the Sub-system Management Processor (SMP) protocol, is used for communications between the shelf controller 72 and a site controller 56, or element manager 58, via lines 59 and 55, or 59 and 57, respectively. The first protocol is a balanced protocol with either party to a communication being able to initiate an exchange of information. The first protocol and the types of message which can be sent will be described in more detail below. As mentioned above, the shelf controller 72 is provided with an RS232 serial output for connection to a site controller 56. Accordingly, if a connection is provided instead to an element controller 62, represented schematically by the switch 227, a pad 228 for connection to an X.25 line, or the like, is used to convert between RS232 format and X.25 format.

A second protocol, called the Radio Link Termination (RLT) protocol, is used for passing control and data information via the control 212 and data 213 buses on the modem shelf. In addition, it should be noted that the same protocol is valid on the radio link 226 between the antenna 52 of the central terminal and the subscriber terminal(s) 20.

The second protocol is an unbalanced protocol with the microprocessor 73 in the shelf controller 72 acting as a busmaster (M) and the microcontrollers 69, 71 and 75 on the analogue card 68, the modem cards 70 and the tributary unit 74 acting as slaves.

The first protocol and the message structure will now be described in more detail.

The first protocol is used for information exchange in both directions between the site controller 56, or element controller 58 if connected instead, and a selected modem shelf controller 73. In the following description of the first protocol, the term management processor will be used for ease of reference to be either a site controller or an element manager, as the first message protocol is the same whether a site controller 56 is connected to a shelf controller 72 via an RS232 link 55, or an element manager 58 is connected to a shelf controller via an X.25 link 57 and the pad 228.

On initially establishing a connection between the management processor and the shelf controller, and preferably also at intervals during operation, an authentication process is undertaken. The authentication process is advantageous to stop potential intruders from extracting, distorting and corrupting the information within the telecommunications system. The details of the authentication process do not form part of the instant invention and will therefore not be described herein. However, it will be appreciated that any number of conventional authentication processes could be employed using the identities (e.g., serial numbers) of various components, transaction numbers, etc.

When it is desired to establish a communication, a call set up sequence is employed. An example of a call set up procedure where an management processor (MP) initiates a call to a shelf controller (SC) includes:

| MP Action/Response | | SC Action/Response |
|---|---|---|
| Set up call using SC address | --> | Wait |
| Detect call setup | <-- | Set up call using MP address |
| Check received MP address Drop call if incorrect | | |
| Send 'authentication' message | --> | Validate 'authentication' message Send 'authentication reply' with SC data and result of validation |
| Check validation result and SC information. Drop call if information check is false | <-- | Drop call if validation false |

The first protocol is message based. Individual messages tend to be relatively short and are blocked for transmission within message packets. Each such packet, which is variable in length, can carry one or more messages, all of which must be the same size. The maximum packet size, excluding the packet header, is chosen in the present example to be 260 bytes. With the 260 byte maximum packet length, the packet may contain either one 256 byte message, thirteen 16 byte messages, thirty-two 4 byte messages or fifty-two 1 byte messages.

A packet consists of the following fields:

| | | |
|---|---|---|
| SOP | Start of Packet | 3 bytes |
| CTRL | Control Byte | 1 byte |
| Messages | | variable |
| EOP | End of Packet | 3 bytes |
| CRC | Cyclic Redundancy Check | 2 bytes |

The purpose of the fields SOP, CTRL, EOP and CRC will now be explained in more detail.

SOP—This defines the start of a packet and is represented by 3 unique bytes, 'AA' hex followed by 'EE' hex followed by 'AA' hex (i.e., in binary 1010 1010 1110 1110 1010 1010). It will be noted that for each nibble the MSB is 1 and the LSB is 0.

CRTL—This defines the controls for the packet. The first two bits define the message size for the packet. The four possible sizes are as follows:

| Type 1 | '0 0' | 1 byte |
| Type 2 | '0 1' | 4 bytes |
| Type 3 | '1 0' | 16 bytes |
| Type 4 | '1 1' | 256 bytes |

The third bit defines the packet direction: '0' is from the management processor to the shelf controller and '1' from the shelf controller to the management processor.

The last five bits are used to identify a packet sequence number (PSN). The packet sequence number represents a window used for flow control. The sender may send a number of packets, up to the window size (or a smaller number (e.g., five) if this is pre-arranged before a packet exchange), before receiving a packet acknowledgment from the receiver. The acknowledgment advances the window and allows the sender to overwrite the packets acknowledged.

A packet (PSN=n) received out of sequence, or with an error after application of the CRC, leads to an acknowledgment for packet sequence number (n–1). The acknowledgment packet indicates whether a CRC error was found. All packets after the acknowledged one then have to be retransmitted to avoid the complication of selective re-transmission.

From the values 0 . . . 31 which can be accommodated within the five bit sequence number, the value 0 is reserved for sequence number re-synchronization (to be described later) so that the normal sequence numbers are 1, 2, 3, . . . 30, 31, 1, 2 . . .

A maximum number of outstanding acknowledgment packets is defined as a number which must be less than half the number of valid sequence numbers. For purposes of illustration only, in examples to be described below, a window size of five is assumed. The receiver is arranged to recognize the concept of the 'previous' window (the last window length's worth of message packets from the current expected sequence number) and the 'next' window (the next window length's worth of message packets).

Acknowledgment packets do not have a sequence number as such, rather the sequence number field will always be set at zero, and are always sent singly (i.e., they are not packaged with other messages). Acknowledgment packets are not acknowledged themselves and are not subject to the window limit, they can be sent at any time.

The immediate re-transmission of packets may be requested by setting the top bit of the packet acknowledgment data byte. This causes any remaining un-acknowledged packets to be immediately re-transmitted rather than waiting for a time-out. The meaning of the rest of the acknowledgment remains unchanged.

After start-up and sometimes during operation, it is necessary to re-synchronize the sequence numbers between the sender and the receiver. The special sequence number 0 is used for this purpose. The reception of the 0 sequence number resets the expected sequence number variable of the receiver. After the reset, it is no longer valid for packets from the previous window to be received until after the first acknowledgment has been sent.

The two message flow directions are completely independent. The state of the message flow from the management processor to the shelf controller is not allowed to affect the flow of messages in the other direction, and vice versa.

In the following, a number of examples of packet flow between a sender and receiver are illustrated. In the examples, a window size of five is chosen. This means that up to five packets may be sent without an acknowledgment. The receiver need not wait until five packets have been received, but can send an acknowledgment when it is convenient. In the packet flow examples set out below, the sender is shown in the left column, the receiver in the right column. The arrows indicate the direction of packet flow.

EXAMPLE 1

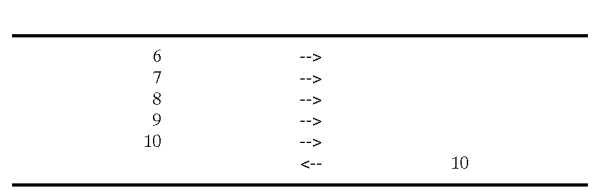

EXAMPLE 2

A packet (not the first after an acknowledgment) is lost. The receiver acknowledges up to the packet before the missing one and packets after the missing one are discarded. The sender re-sends the remaining packets after a timeout. The receiver can then send the acknowledgment on recognizing the missing packet.

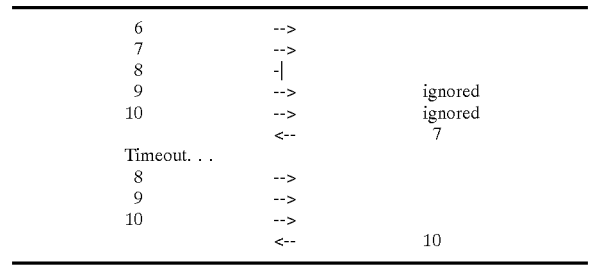

EXAMPLE 3

The first packet after an acknowledgment is lost. In this case the receiver does not send an acknowledgment but waits for the packets to be re-sent in due course.

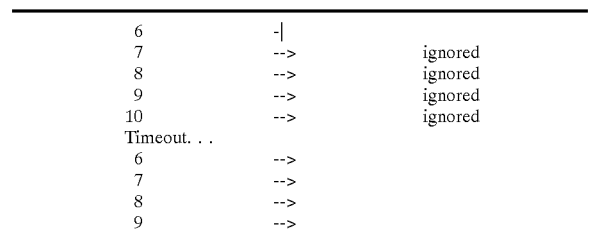

-continued

| | | |
|---|---|---|
| 10 | --> | |
| | <-- | 10 |

EXAMPLE 4

An acknowledgment is lost. In this case the receiver will get packets from the previous window which it had tried to acknowledge. The response is to resend the previous acknowledgment as soon as a packet from the previous window is received. It is possible that a plurality of acknowledgments will be sent as transmission is not instantaneous. The sender accounts for this and discards acknowledgments for packets for which acknowledgments have already been received.

| | | |
|---|---|---|
| 6 | --> | |
| 7 | --> | |
| 8 | --> | |
| 9 | --> | |
| 10 | --> | |
| | \|- | 10 |
| Timeout. . . | | |
| 6 | --> | |
| | <-- | 10 |

EXAMPLE 5

A spurious packet is received, which is neither from the previous nor the next window. The receiver ignores the packet. It may be due to corruption, in which case the packet will be treated as lost and one of the above scenarios will come into play. It may also be due to a loss of synchronization. If this is the case, the sender will detect this due to lack of acknowledgments and will then retransmit all the outstanding packets starting with the special sequence number 0.

| | | |
|---|---|---|
| 7 | --> | |
| 8 | --> | |
| 9 | --> | |
| 10 | --> | |
| | <-- | 10 |
| 5 | --> | ignore |

EOP—This defines the end of the packet and is represented by three unique bytes, 'EE' hex followed by 'AA' hex followed by 'EE' hex (i.e., in binary 1110 1110 1010 1010 1110 1110). The initial combination of bytes of the end of packet sequence should start with a byte sequence which is invalid for data in the message fields. It will be noted that for each nibble the MSB is 1 and the LSB is 0.

The use of the end of packet field avoids the need to identify the total length of packets by indicating the number of bytes or the number of messages of a given size, for example.

CRC—This is used to detect errors in both the packet header and the messages. A CRC error leads to the transmission of an acknowledgment for the last packet correctly received.

The structure of the message records will now be described in more detail. Each message record consists of a four byte header followed by the message data field.

The message header consists of: a message control byte; a sub-address byte; a message ID byte; and a task reference number byte.

One bit in the message control byte (e.g., the MSB) defines the type of message (e.g, '1' for command, '0' for report) and is used in combination with the message ID to define the message processing required. The remaining 7 bits of the message control byte define an element address to which the message refers (e.g, the address of a modem to which a message is directed).

The sub-address byte is a sub-address field within the element addressed by the message control byte.

The message ID byte defines the identity (equivalent to a command code) of the message.

The transaction identifier byte can be used to match up commands to a shelf controller with replies from it.

For any message capable of exceeding 256 bytes, the first byte of the data field contains a message sequence number (MSN) which is set to zero for each new message sent and is incremented for each 256-byte fragment (i.e. packet sending that message). The first data byte also contains a 'more' bit to indicate that the current package is not the last one for that message. The bit is set to zero for the last message fragment sent. If such a message is received out of sequence, the receiver sends a packet acknowledgment for the last packet correctly received. The sender will then resend all packets following the one which has been acknowledged.

All reports relating to specific events will be sent with an event sequence number (ESN) to distinguish them from other events. An event clear message can be used to identify an event to be cleared.

The length of the data field for a message is given in the packet control byte. All messages in a packet have the same length. In the present example the data field can be 1, 4, 16 or 156 bytes in length.

Figure 21:
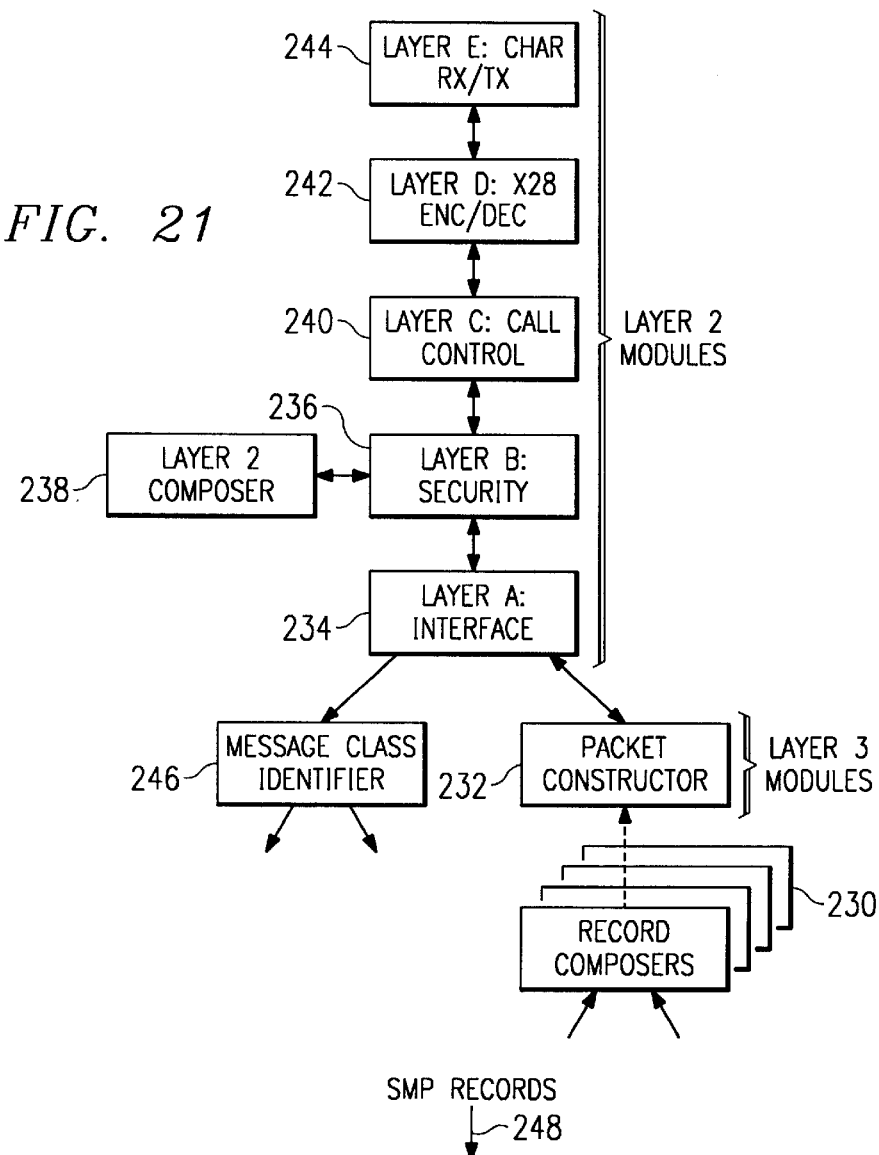
FIG. 21 is a schematic block diagram illustrating message handling modules for passing control messages between a site controller or element manager and a modem shelf controller in the telecommunication system of FIG. 1.

FIG. 21 is a schematic block diagram illustrating the architecture of the message handling modules which are provided in the management processor and the shelf controller for constructing, sending and receiving messages.

The message handling modules are described with reference to FIG. 21 for the situation where they are located in a shelf controller, which is communicating with an element controller via an X.28 format line to a pad and from there to the element controller via an X.25 format line. The same structure is used where there is an RS232 connection (i.e., an X.28 format line) directly to a site controller. Similarly, the same basic structure is employed in a site controller or element controller at the other end of the line. The processes performed in the message handling modules can be implemented on suitable processing hardware including, as appropriate, one or more microprocessors and/or special purpose hardware.

The message handling modules, and consequently the protocol can be thought of as having a plurality of different layers. The layers A–E illustrated in FIG. 21 form part of a layer 2 protocol.

In FIG. 21, layer E 244 is responsible for transmitting and receiving strings of characters representing messages to and from the transmission link. The transmitter is responsible for duplicating characters in message packets. The receiver contains a state machine that assembles incoming characters into messages. This layer performs particular functions, which are: initialize the layer, transmit a message, receive a message and accumulate messages. The last of these functions is responsible for accumulating bytes into messages. It handles both communications with the pad and command messages as well as message packets. Bytes that cannot be fitted into a message are discarded.

Figure 23:
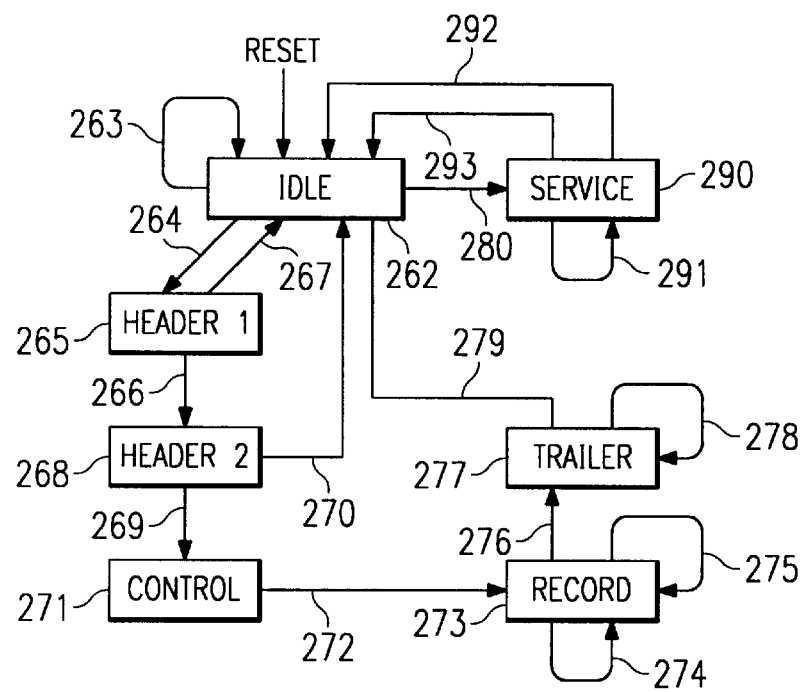
FIG. 23 is a message accumulation state diagram for a message handling module of FIG. 11.

FIG. 23 is a state diagram illustrating the process of accumulating bytes into packets in layer E.

In state 262 the process idles waiting for an input byte.

In state 262, if a received byte is a printable character, then control passes via 280 to state 290 where the process waits for a service signal.

In state 290, if a printable byte is received, then this is stored and control loops at 291. In state 290, if another control character is received, then all bytes are discarded and control passes via 292 to state 262. In state 291, if a carriage return or line feed byte is received, then this is discarded and a pad message is processed and control passes via 293 to state 262.

In state 262, if a received byte is a start of packet byte, then the byte is stored and control passes via 264 to state 265. In state 262, if a received byte is anything other than a start of packet byte or a printable character, the byte is discarded and control loops at 263.

In state 265, if a first header byte is received, then the byte is stored and control passes via 266 to state 268. In state 265, if any other byte is received, then all bytes are discarded and control passes via 267 back to state 262.

In state 268, if a second header byte is received, then the byte is stored and control passes via 269 to state 271. In state 268, if any other byte is received, the all bytes are discarded and control passes via 270 back to state 262.

In state 271, any byte received is stored, a message length is calculated, a new message condition is started and control passes to state 273.

In state 273, if a received byte does not complete a record, the byte is stored and control loops at 274. In state 273, if a received byte completes a record but no end of packet is received, then a new message record is started and control loops at 275. In state 273, if a received byte completes a record and an end of packet byte is received, then the byte is stored and control passes via 276 to state 277. In state 277, if a received byte does not complete a packet trailer, then the byte is stored and control loops at 278. If a received byte does complete a packet trailer, then the byte is stored and control passes via 279 to state 262. This completes the description of the state diagram of FIG. 23.

Returning to FIG. 21, layer D 242 is a layer which provides message composition/decomposition for messages in accordance with the X.28 format. Message packets are passed through this layer unchanged. This layer performs the following functions to provide encoding and decoding of pad to the X.28 standard. The functions are: send a wake-up string to the pad; send a message packet to the pad; decode an incoming pad message; send initialization messages to the pad; send a call message to the pad; send a clear message to the pad; send a parameter request message to the pad to probe whether it is still there; and receive an incoming message packet.

Layer C 240 provides for call control. This layer maintains the connection with the transmission link (e.g., the pad 228) and makes network calls when message packet output is required. It also is responsible for breaking calls when they idle for too long. This layer performs the following functions to maintain the serial connection to the pad and to maintain the call through the X.25 network, namely: initialize the layer; perform background processing; respond to a call from layer D when a disconnect is detected; respond to a call by layer D when a connect is detected; respond to a call by layer D when a pad prompt is received; instruct the layer to create a connection with the management processor; send an application packet; respond to a call by layer D when communication with the pad is lost; receive an incoming message packet; and respond to a call by layer D to indicate receipt of the pad probe response.

The background processing function has the following tasks:

If the connection with the pad is down, a wake-up string is sent to the pad once per second until a pad prompt is received, this then triggers the initialization of the pad.

If a call to the management processor is required and one is not currently in progress, a call is placed with the pad.

Every twenty seconds, if the pad is recorded as being connected, a probe message is sent to the pad including a request for the state of a pad parameter. If a response to this is not received within a ten second time-out period, the pad is assumed to be disconnected.

Layer B 236 provides functions for performing the exchange of authentication messages between the shelf controller and the management processor whenever a call is connected. The functions are: initialize the layer; request the creation of an authenticated link with the management processor; respond to call by layer C when a call is connected; respond to a call by layer 3 when an authentication message is received; respond to a call by layer C when a call is disconnected; send a message packet; and receive a message packet.

The level 2 composer 238 provides encoding functions for authentication messages. The functions are: encode a shelf controller ID (SC ID) message; encode an 'authentication reply' message; and encode a 'packet acknowledgment' message.

Layer A 234 provides programming interface functions to layer 3 of the protocol stack. The functions are: initialize the layer; return TRUE if the layer can accept an output message; send an application packet; respond to call by layer B when a link is established; and receive a message packet.

The packet constructor 232 collects messages into packets for transmission and handles the re-transmission of packets in case of failure.

The record composers 230 are a series of modules which provide a layer between the encoded form of a message and the information which the message represents. These record composers actually form part of other subsystems that generate SMP messages and are only shown here to put the message handling modules into context.

The message class identifier 246 takes incoming packets and breaks them into their component messages (message records). Each message (message record) is then passed to an appropriate decoder module. This module is also arranged to track sequence numbers of received packets and generate appropriate acknowledgments. To do this it maintains in storage a list of received sequence numbers and the current window boundaries. Logic (typically implemented in software) then tracks the sequence numbers and interprets the sequences as described above to determine when to send an acknowledgment and what to send.

The packet constructor and the message class identifier form part of the layer 3 protocol.

Figure 22:
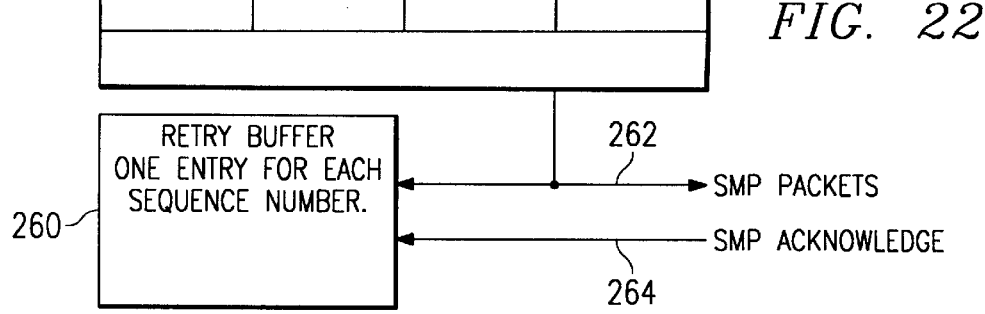
FIG. 22 is a schematic block diagram illustrating message packet construction for control messages in FIG. 11.

FIG. 22 illustrates the packet constructor module 232 in more detail. The data records for messages are assembled into packets by this packet constructor module. Incoming records at 248 are sorted into one of the four packet construction buffers 250 according to the data field size.

Separate buffers 252, 254, 256 and 258 are provided for 1 byte, 4 byte, 16 byte and 156 byte data fields, respectively. When a buffer is full or in response to a predetermined transmit instruction, for example after a predetermined time has elapsed, the content of a buffer is sent over the transmission link and also copied to slot in a retry buffer 260 corresponding to the packet sequence number. There is one slot in the retry buffer for each sequence number. The retry buffer entry is cleared if an acknowledgment is received. If a retry instruction is received, the failed packet is re-transmitted directly from the retry buffer. If the retry buffer entry is not available to receive a packet from the packet construction buffers 150, or the number of packets awaiting transmission exceeds the size of the window, then the transfer and transmission is not performed. In this case, further requests to add message records are rejected until space becomes available. If a packet is not acknowledged within an acknowledgment timeout period, the packet is re-sent.

In this embodiment, the construction buffers 252, 254, 256 and 258 become full when they contain eighty-six 1 byte records, forty-three 4 byte records, fourteen 16 byte records or one 256 byte record.

The RLT protocol, which was introduced in the description of FIG. 20 will now be described in more detail.

The RLT protocol is used for passing control and data information via the control 212 and data 213 buses on the modem shelf and is valid on the radio link from the antenna 52 of the central terminal and the subscriber terminal(s) 20.

The RLT protocol is an unbalanced protocol with the master communications interface 73 in the shelf controller 72 acting as a busmaster (M) and the slave communications interfaces 69, 71 and 75 on the analogue card, the modem cards and the tributary unit acting as slaves. In this example, the master communications functions in the shelf controller are shared between a 68000 series microprocessor and a Hitachi H8 microcontroller, which will be referred to as the master client and master server, respectively. Alternatively, the client and server functions could be implemented on one microcontroller or processor. The slave communications processing functions in the tributary unit are also shared between a 68000 series microprocessor and an H8 microcontroller. In the other slave units, the slave communications processing is performed in a Hitachi H8 microcontroller, which will hereinafter be referred to as the slave server.

Figure 24:
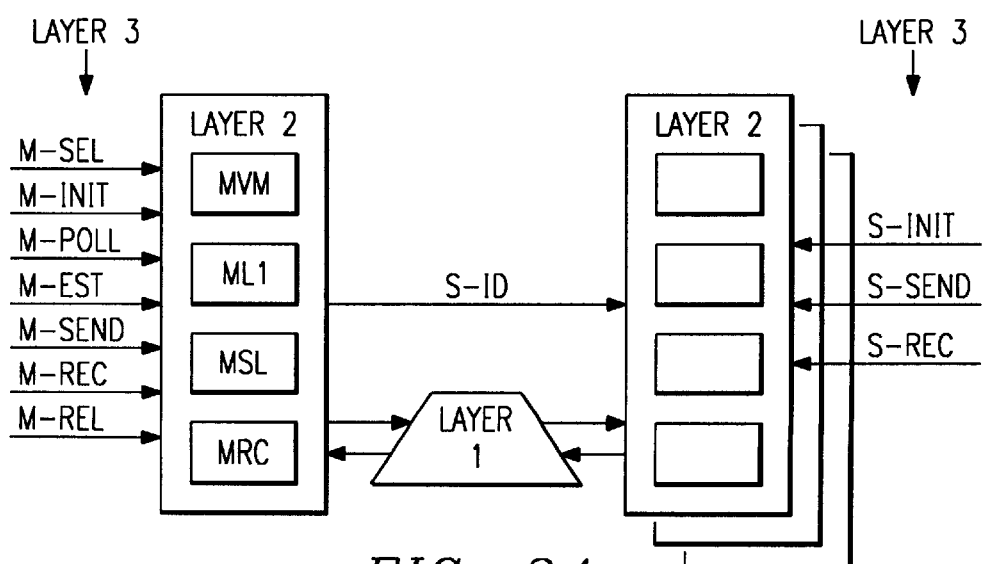
FIG. 24 is a schematic diagram illustrating the different protocol levels for connection of a master to a slave for communication between a shelf controller and slave elements.

The second protocol is based on three layers. FIG. 24 is a schematic representation of this layered protocol structure.

The master communications end point functions performed at the third layer include the following functions.

A master initialization service process (M-INIT) sets up the master client part of the master communications end-point in the shelf controller. This service call must be executed before the other communications functions can be performed.

A master initialization poll process (M-POLL) initializes the master server part of the master communications end-point. This service process must be called before the following functions can be performed.

A master establish process (M-EST) establishes a connection over the bus from the master to a slave in response to a slave address referencing a slave board. Messages can be sent and received once a connection has been established.

A master send process (M-SEND) takes a message and sends it to a nominated slave over the bus as long as the connection to the slave has already been established.

A master receive process (M-REC) receives a message from a slave to be passed, for example, to a management processor.

A master release process (M-REL) releases a connection to a nominated slave preventing further send and receive functions from being performed.

A master select process (M-SEL) provides an addressing mechanism for the master to select one of the slaves with which to communicate.

The slave communications end-point functions performed at the third layer include the following functions.

A slave initialization service process (S-INIT) initializes the slave communications end-point. This service function must be called before any of the other functions can be performed.

A slave send process (S-SEND) takes a message and sends it to the master, as long as the master has already established a connection to the slave.

A slave receive process (S-REC) function receives a message from the master to be passed, for example, to a network service element addressed by the message.

The master communications end-point M includes the following functional components.

A master VM component (MVM) provides a set of services for the management of storage to dynamically allocate memory for buffers, queues, semaphores and timers.

A master layer 1 component (ML1) provides low level communication primitives for supporting byte transfer from the master server using a serial communication interface.

A master status list component (MSL) holds the status of each link from the master to one of the slaves. This is updated when a connection is made, broken or released.

A master retry count component (MRC) tracks the number of retires attempted in master to slave layer 2 communications. If this exceeds the limits for layer 2, the master breaks the connection with the slave.

The slave communications end-point M includes substantially the same functional components as the master.

The master layer 1 component (ML1) provides the following level 1 functions.

A master layer 1 initialization process initializes the layer 1 communications system. No layer 1 communications can take place until this process has been invoked.

A master layer 1 byte-output process outputs a byte out of a serial communications port and waits for an acknowledgment from the receiver. If no acknowledgment is forthcoming, then a failure is registered.

A master layer 1 data-out process is similar to the byte output process except that more than one byte can be transferred.

A master layer 1 address-out process is similar to the byte output process except that the source byte is output with a bit set to indicate that this relates to a multiprocessor address rather than a data byte.

A master layer 1 data-in process waits for a specified number of bytes to be received on the communications port. If less than the required number of bytes is received, then a failure is registered.

The master VM component (MVM) provides the following functions:

A master VM initialization process initializes the master VM component. This must be called before any other VM service.

A master VM get-message process removes a message from one of the queues held by the VM component.

A master VM put-message process places a message on one of the queues held by the VM component.

A master VM queue-full process indicates whether a selected queue is full.

A master VM get-buffer process allows a buffer to be requested from a buffer pool held by the VM component.

A master VM give-buffer process allows a buffer requested by the get-buffer process to be returned to the pool.

A master VM get-semaphore process allows a semaphore held by the VM component to be set.

A master VM give-semaphore process allows a semaphore set by the get-semaphore process to be cleared.

A master VM set-timer process sets a time-out period for one of the timers held by the master VM component. A flag is set by the master VM component when the timer expires.

A master VM add-timer function process registers an application function with the master VM component to be called at a particular time.

The master and the slaves both use VM components to provide buffers, queues, semaphores and timers in order to permit the transfer of messages. The operation of the second protocol will be illustrated by reference to specific examples below:

The first example relates to the establishment of a connection from a master to a slave.

Figure 25:
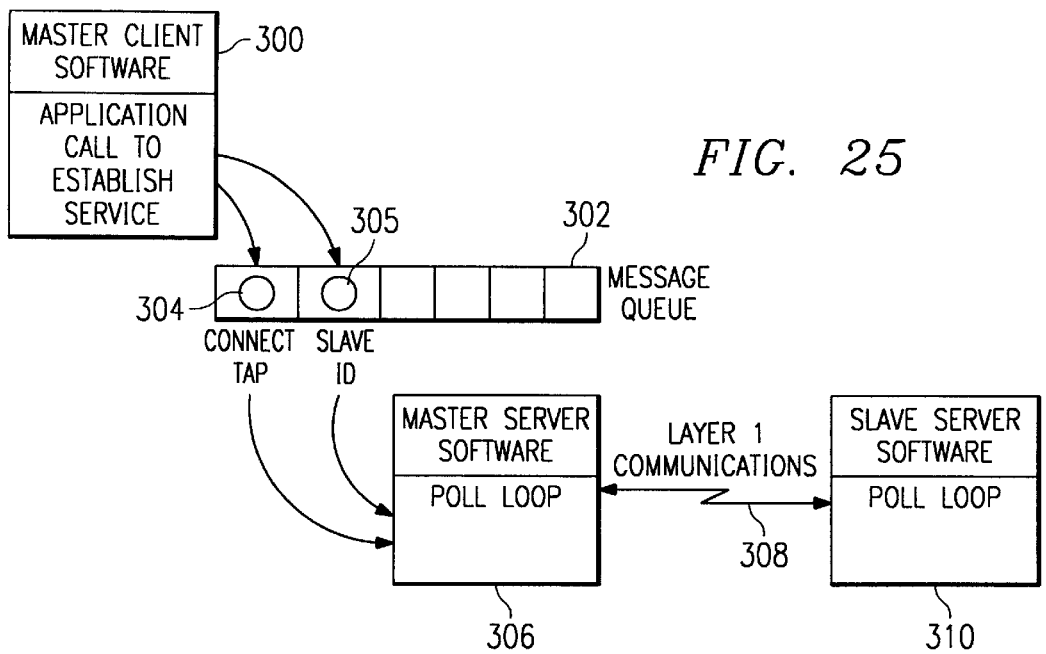
FIG. 25 is a schematic diagram illustrating the establishment of connection of a master to a slave for communication between a shelf controller and slave elements.

To connect the shelf controller master to one of the slaves, the shelf controller invokes the master establish process in the master end-point and supplies the link address of the slave (S-ID) with which the connection should be made. FIG. 25 illustrates how the master 300 maintains a message queue 302 to store requests such as an establish request, and how these requests are handled.

Invoking the master establish process has the effect of placing a connect tag 304 onto the message queue along with the address (S-ID) 305 of the slave with which the connection is to be made. The work queue is shared between the client and server portions of the master end-point allowing a master client application to place a connect tag onto the message queue via the establish process and the master server to remove it and act upon it as part of the server poll processes. With this mixed client and server implementation, poll processes are introduced between the master and slave as set out below:

A master poll process 306 is provided in the master server and is called repeatedly on the master server. This services all of the requests placed in the message queue by the client.

A slave poll process 310 is provided in the slave server and similarly is called repeatedly on the slave server.

When called, the master poll process checks the message queue for requests and in this case extracts a connect tag and the slave address from it. The pool process then sends out a connect command 308 to the nominated slave and awaits a response. If the response is valid, the status of the link to the selected slave is changed to 'connected', allowing the send and retrieve services to be used.

The second example relates to the sending of a message from the master to a nominated and connected slave. This is illustrated in FIG. 26.

In order to send a message from the master to the nominated and connected slave, an application invokes the master send process 312. The send process requests a buffer 323 from the master VM component buffers 324 and copies the message to be sent to it. It then places a send tag 316 and the buffer number 318 on the work queue 314 for a subsequent poll call to deal with.

The master poll process 306 extracts the send tag 316 and the buffer number 318 from the message queue 314. It uses the buffer number 318 to extract 326 the message from the buffer 323 and then sends 330 the message to the nominated slave.

The message is received at the slave end-point under interrupt. At the next call to the slave poll process 310, a buffer 343 is requested from the slave VM component buffers 344 to hold the incoming message. The slave poll process 310 then places the message into the buffer 343 and puts a receive tag 336 and the buffer number 338 onto the slave receive queue 334. Messages can be received and put into the slave receive queue 334 until either the queue is full or no further buffers are available in the slave VM component buffers 344. Once a message has been transmitted and successfully received, the master gives its message buffer back to the master VM component for re-use using the master give-buffer process.

The message is delivered to the application when the application invokes a slave receive process 346. The receive process 346 checks the receive queue 334 for entries and, on finding one, extracts the buffer number 338 and reads the incoming message from the buffer 343. The buffer 343 is then returned to the slave VM component for re-use.

The sequence for sending a message from the slave to the master is similar except that the slave holds a separate send queue, rather than placing send and receive tags on the message queue. Send requests are placed on the send queue by client calls to the slave send process. When a slave receives a ready-to-receive command from the master, the slave poll process removes a send request and a buffer number from the send queue, gets the message from the slave VM buffer and transmits it to the master. At the end of the sequence it returns the buffer to the slave VM component for reuse.

The second protocol uses a sequence number, which alternates between 1 and 0, for passing messages between the master and the slave. An example of a message exchange is set out below.

Initially an exchange between the master and the slave establishes a link as part of a level 2 process.

| Master | | Slave |
|---|---|---|
| Poll(address) | --> | |
| | <-- | Response(data or not) |
| Reset | --> | |
| | <-- | Reset response |

Then a data message exchange takes place as part of a level 1 process.

| Master | | Slave |
|---|---|---|
| SEND(0) data | --> | |
| | <-- | SRR(1) |
| MRR(0) | --> | |
| | <-- | DATA(1) |

In this process the 1 or 0 between brackets associated with each message forms the sequence number, which can be represented by a single bit which is switched by a recipient of a message before a reply is sent in response to the successful receipt of the message. If the message is not received correctly, then the sequence number is not switched. This is illustrated in the following example.

| Master | | Slave |
|---|---|---|
| SEND(0) data | --> | |
| | <-- | SRR(1) |
| MRR(1) | --> | |
| | <-- | SRR(0) |
| MRR(1) | --> | |
| | <-- | DATA(0) |

In the sequence shown immediately above, the SRR message transmitted by the slave was not correctly received by the master. Accordingly, a response was sent without changing the sequence number. This then caused the slave to re-send the SRR message and the sequence proceeds as before but with the sequence numbers now inverted with respect to the first example.

In practice the sequence number is provided twice in a message byte, in two bits, although it could alternatively be provided only once, in one bit.

Figure 27:
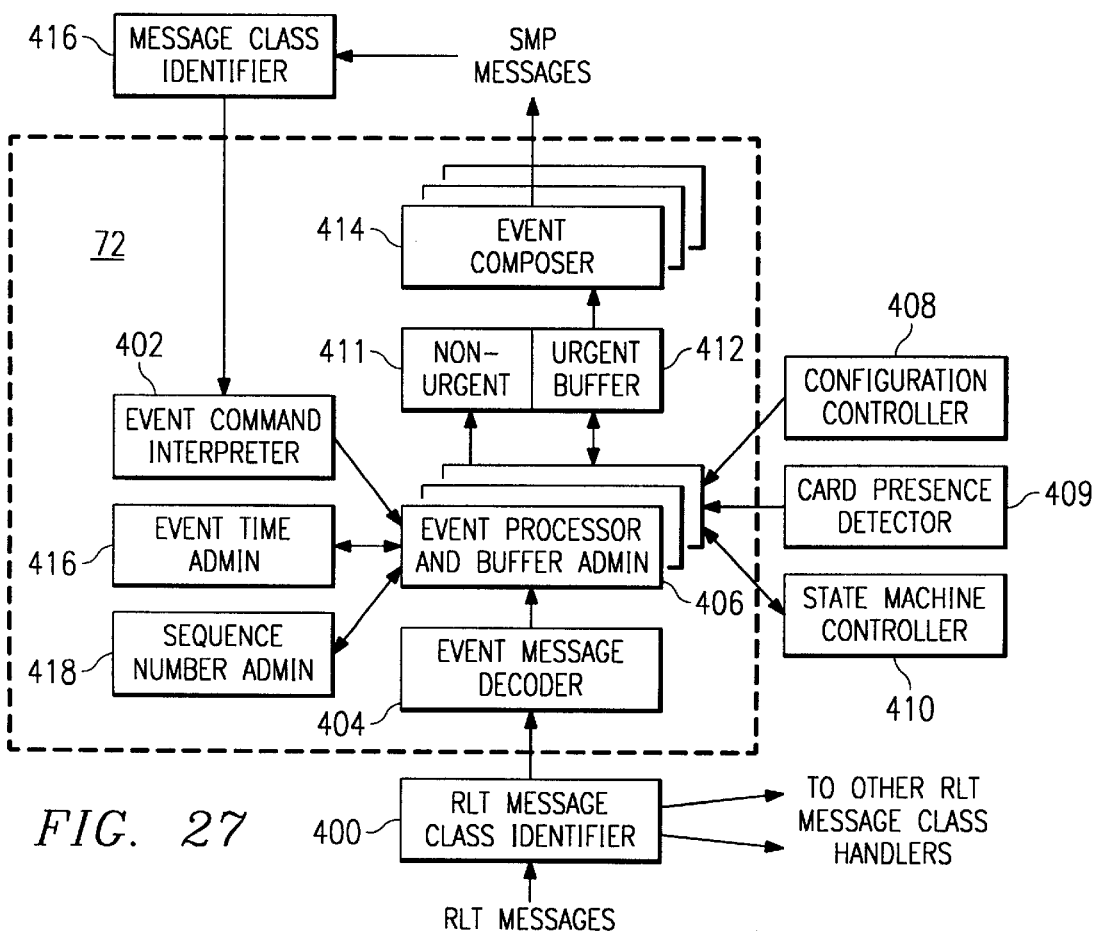
FIG. 27 is a schematic block diagram illustrating event handling by a shelf controller.

The shelf controller provides an interface between the SMP and RLT protocols. The shelf controller operates mainly in accordance with the first protocol, but is provided with the microprocessor and a communications microcontroller which together form a client/server end point for the second protocol and convert messages from one protocol to the other. FIG. 27 illustrates an example of how the shelf controller provides an interface between the messages sent in accordance with the two protocols, in this case for event handling.

An event command interpreter 402 decodes event commands received from the management processor under the SMP protocol and appropriate functions from other event modules are called to implement the command.

An event message decoder decodes an incoming message received from one of the slave modules under the RLT protocol and calls appropriate functions from the event controller.

An event processor 406 provides one function for each event message type and, in addition, functions which service internal events from a configuration controller 408 and other sources such as a card presence detector 409 and a state machine controller 410 in the shelf controller. The functions include passing events to either a non-urgent buffer 411 or to an urgent buffer 412 and directing movement of buffer contents to and from the management processor in response to control messages.

An event composer 414 allows the constructions of messages for sending under the SMP protocol containing event records and other related matters.

An event time administrator 416 marks the events with the time they are received by the event processor. A sequence number administrator 418 handles the assignment of sequence numbers to event messages. A separate current sequence number is maintained for each event.

Similar processing is performed for alarms and other messages.

Figure 28:
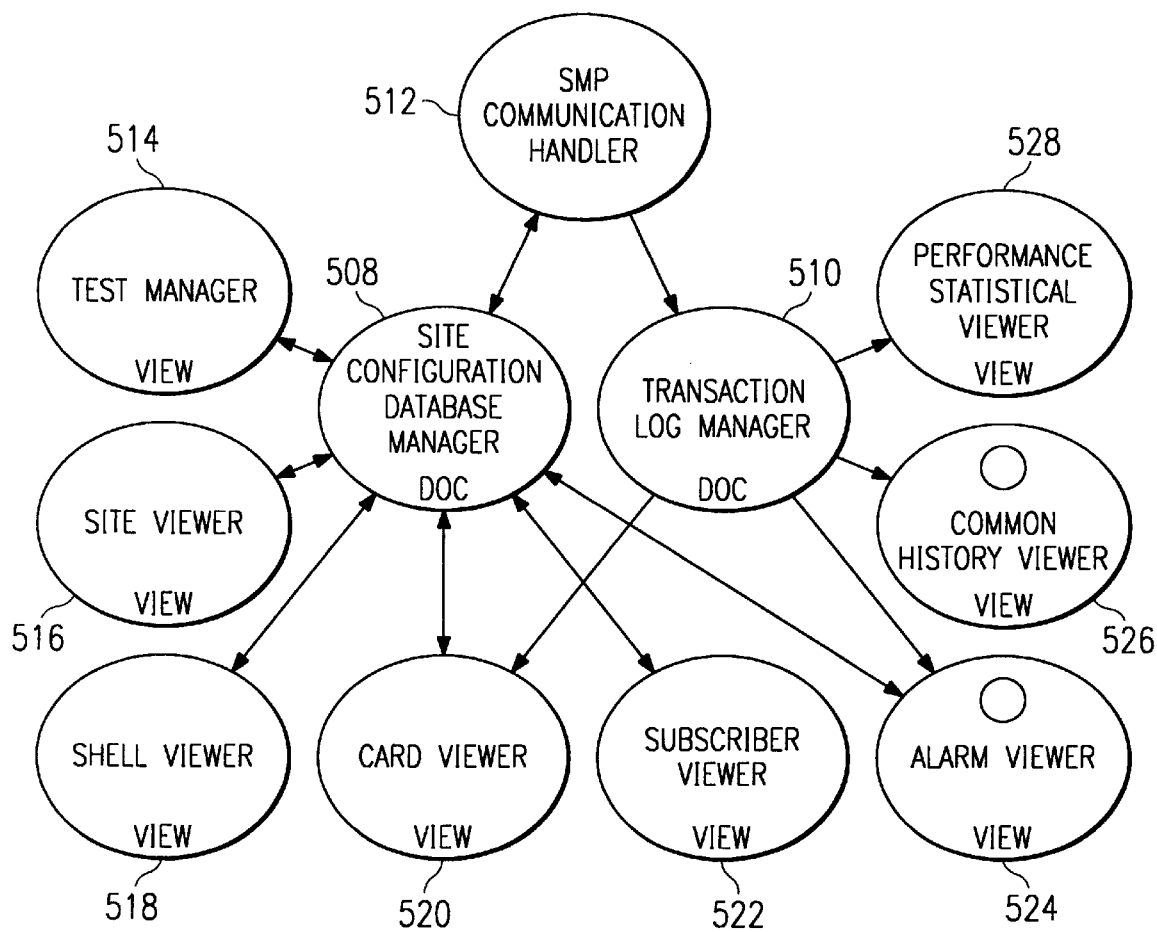
FIG. 28 is a schematic block diagram illustrating control structures of a control terminal site controller.
Figure 29:
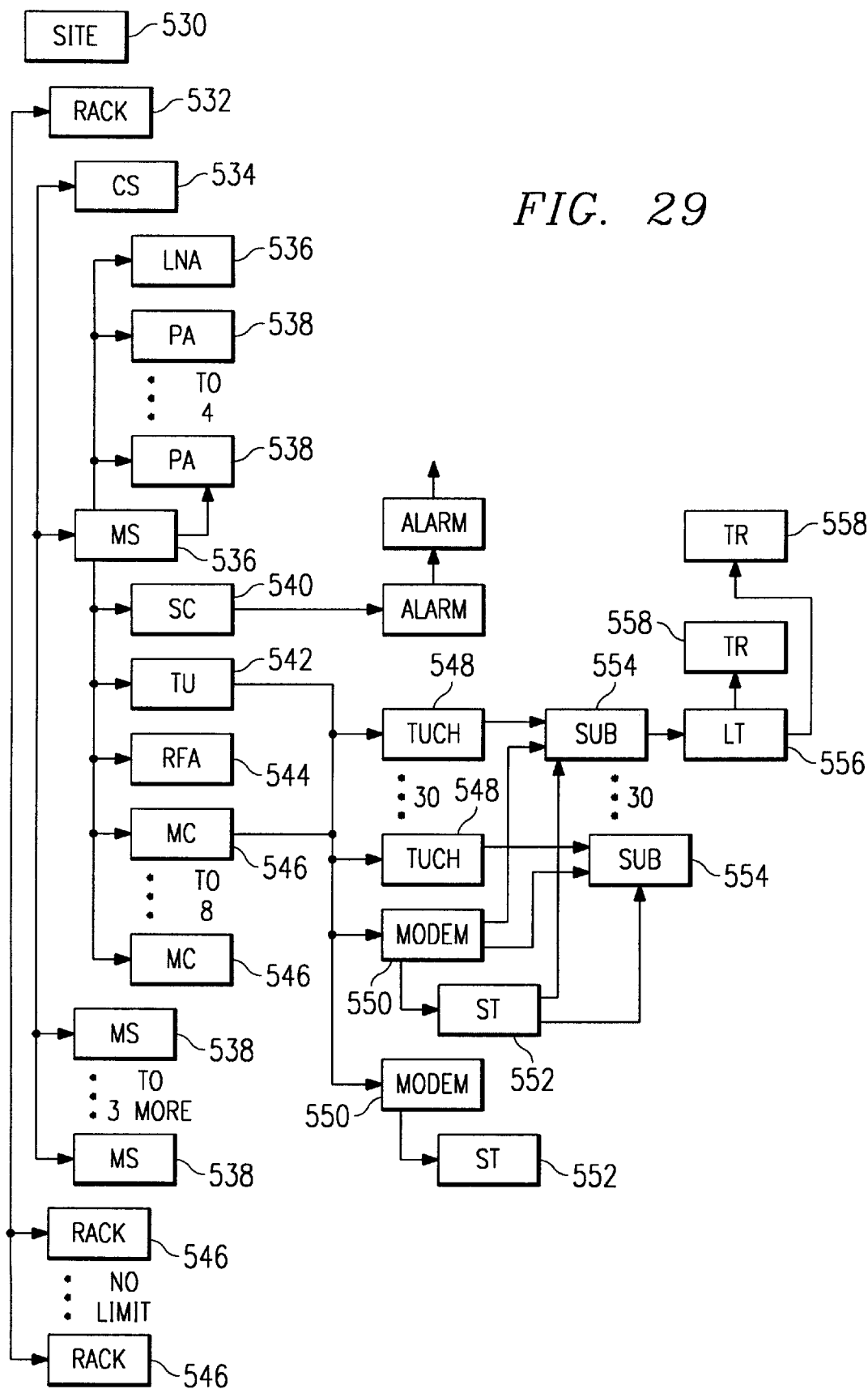
FIG. 29 is a schematic block diagram illustrating a configuration data base structure of a control terminal site controller.

FIG. 28 is a schematic overview of the site controller and illustrates the relationship between various server objects. The management of the telecommunications network including the central terminal, the subscriber terminals and the site controller, is based on a hierarchical object-based data structure. FIG. 29 provides one possible overview of that data structure.

The SMP communications handler 512 is responsible for the transmission and reception of SMP messages between the site controller and the shelf controller. A test manager 514 carries out line tests. A site viewer 516 enables a view to be created of the whole site using data contained in the site configuration database which is managed by the site configuration database manager 508.

The site configuration database contains an object-based structure where a plurality of objects, each representing a respective element of the site, are arranged in a structured hierarchy. FIG. 28 represents an example of such a structured data base. The various objects in the list are linked together by at least one pointer for each node which points to its parent object. This process continues right up to the root node which represents the whole site.

Various objects will be described in more detail below. Each of the objects includes a name field defining the name of the object and a status field containing status information about the object. The object may also contain one or more alarm parameters which can be set in response to specific alarm conditions relating, for example, to hardware errors, line malfunctions, etc. The status field for an object includes a fault parameter which becomes set when at least one alarm parameter in the object or in a dependent object is set. In other words, when a fault parameter is set in one object, this fault status is propagated up the tree using the pointers to successive parent objects. Each of the objects also contains a definition of the object which can be used for displaying a representation, or view, of that object.

There is one site object (SITE) 530 in a database. This contains data about the site and is created automatically when the database is initialized. As well as a name field and a status field, this object contains a field defining the site location and a list of rack objects that the site contains.

The Rack objects (RACK) 532, 540, 542, etc. each represent a rack and contain data about the rack including a name field, a status field, a pointer to the site object 530, and pointers to the shelf objects (e.g., for rack object 532, pointers to the combiner shelf object (CS) 534 and up to four modem shelves (MS) 536, 538).

The combiner shelf object (CS) 540 represents an RF combiner shelf and contains data about the combiner shelf including a name field, a status field, a pointer to the containing rack object (e.g., RACK 532), a pointer to the shelf's low noise amplifier card object (LNA) 536, and pointers to power amplifier card objects (PA) 538.

The modem shelf objects (MS) 536 and 538 each represent a modem shelf and contain data about the modem shelf including a name field, a status field, a pointer to the containing rack object (e.g., RACK 532), an identifier field for the position of the shelf in the rack, a field for the identity of the serial port through which the site controller communicates with the shelf, a field for the baud rate for the serial port, a pointer to the shelf controller card object (SC) 540, a pointer to a tributary card object (TU) 542, a pointer to the RF analogue card object (RFA) 544, and pointers to up to eight modem card objects (MC) 546.

The modem card objects (MC) 546 each represent a modem card and contain data about the card including a name field, a status field, a pointer to the modem shelf object (e.g., MS 536) containing the modem card, an identifier number for the modem card (0–7) and pointers to modem objects (MODEM) 550.

The modem objects (MODEM) 550 each represent a modem and contain data about the modem including a name field, a status field, a pointer to the modem shelf object (e.g., MS 536), a pointer to the subscriber terminal object (ST) 552 which is connected via the radio link to the modem, pointers to subscriber objects (SUB) 554 supported by the modem and pointers to the tributary unit channel objects (TUCH) 548 which connect to the modem.

The shelf controller card object (SC) 540 represents a shelf controller and contains data about the card including a name field, a status field and a pointer to the modem shelf object (e.g., MS 536).

The Tributary unit card (TU) 542 represents a tributary card and contains data about the card including a name field, a status field, a pointer to the modem shelf object (e.g., MS 536), pointers to the card's tributary unit channels (TUCH) 548 and a definition field for the protocol used by the tributary card.

The RF combiner and analogue card object (RFA) 544 represents the RF card and analogue card pair and contains data about the card pair including a name field, a status field, a pointer to the modem shelf object (e.g., MS 536), a field representing the transmitter frequency and a field representing the receiver frequency.

The low noise amplifier card object (LNA) 536 represents a RF combiner shelf low noise amplifier card and contains data about the card including a name field, a status field and a pointer to the RF combiner shelf object (RFC) 534.

The power amplifier card objects (PA) 538 each represent an RF combiner shelf low noise amplifier card and contain data about the card including a name field, a status field and a pointer to the RF combiner shelf object (RFC) 534.

The subscriber terminal object (ST) 552 represents a subscriber terminal served by a modem and includes data about the subscriber terminal including a name field, a status field, the CDMA code of the subscriber terminal channel and a pointer to the corresponding modem (MODEM) 550.

The subscriber objects (SUB) 554 each represent a subscriber circuit and contain data about the subscriber including a name field, a status field, a recall field, an intrusion tone field and a subscriber line active field as well as a pointer to the modem (MODEM) 550 and the tributary unit channel (TUCH) 548 associated therewith.

A line test object (LT) 556 represents a line test in progress and contains data about the line test including a name field, a status field and a pointer to the subscriber object 554.

A test result object (TR) 558 indicates a test result and contains data about the test result including a name field, a status field and a pointer to the line test object which initiated the test.

Uncleared alarm objects 559 are chained to their source card.

Returning to FIG. 28, the transaction log manager 510 contains a history of all the configuration messages sent to the site's shelves and all the event and performance messages received from the shelves, subject to log file size limits.

The site viewer 516 allows an operator to monitor the state of the site. The site viewer provides alternative views of the site to be displayed on the display screen of the site controller workstation using the data stored in the object database.

In accordance with a first view, the site viewer provides a view showing the main nodes of the object based hierarchy, namely a representation of the site object node with a representation of each of the rack object nodes connected thereto and the links between them, corresponding to the pointers in the objects. The display can be structured similarly to the representation in FIG. 29, but without the lower order objects being displayed.

The user can interact with this first view, for example to expand one branch of the view. This can be achieved using conventional windows-based operating tools for pointing to and selecting a displayed object using a mouse and mouse buttons, for example. The daughter nodes for a selected node can then be displayed. This process can be used, for example, to expand branches of a tree to locate faults.

The site configuration database manager interacts with the object database to monitor and update fault parameters and alarm parameters in the database objects. When an alarm condition occurs in a network element, the database manager sets the corresponding alarm parameter in the object for that network element. At the same time the fault parameter is set for that database object. A database object may contain more than one alarm parameter. The fault parameter in the object database status field is set whenever one or more alarm parameters are set in that database object. The database manager also traces the pointers up the tree to the site object setting the fault parameters for each of the database objects which it encounters on the way.

The site viewer, and also the other viewers to be described later, are responsive to the fault parameters in the database objects to visually distinguish displayed objects for which a fault parameter has been set. Typically the fault conditions is displayed by changing the displayed color of the object in question, and/or by causing the object in question to flash. In a preferred embodiment, a displayed object for which a fault condition has occurred is flashed red.

In the situation where the first site view mentioned above is displayed, the site object and the rack object corresponding to the rack in which a fault has occurred will flash red. This will alert the operator to the fault condition, and by selecting the appropriate displayed rack object, the database tree structure can be expanded along the appropriate branch down to the object corresponding to the network element where the fault has occurred.

Alternative display expansion modes can be provided where the tree is automatically expanded when a fault occurs, or when the operator requests the expansion of the tree (for example by selecting the lowest order object currently displayed in the fault line) or where the tree has to be expanded manually level by level by the operator selecting the appropriate object to be expanded.

A second site view is also provided where a graphical representation of each rack on the site is displayed to the operator on the display of the site controller work station. Each rack object includes a rack identifier so that each displayed representation of a rack corresponds to a physical rack. The site viewer causes the objects for the racks to be accessed via the database manager 508 in order to display an appropriate graphical representation of each of the rack frames with openings for the rack shelves. These openings are then filled with representations of the fronts of the respective shelves. The site viewer causes the objects for the shelves to be accessed via the database manager 508 in order to display a graphical representation of each shelf front in an appropriate opening in the graphical representation of corresponding rack frame. The combiner shelf always occupies a fixed position within the rack and the modem shelf objects contain an identifier field for the position of the shelf in the rack, so that each representation of a shelf front in the rack display corresponds to a physical rack shelf position.

In this case, when the fault parameter in a shelf object is set, the representation of the shelf on the display will be highlighted (e.g., by displaying the shelf in a different color or flashing). Accordingly, simply by viewing the display, the operator can immediately identify which rack has a shelf with a fault and the physical position of the shelf within the rack.

Moreover, the site viewer is responsive to the operator selecting the highlighted shelf (e.g. by clicking on a mouse button when a mouse pointer is pointing at the shelf in question) to call the shelf viewer 518. The shelf viewer 520 causes a graphical representation of the shelf of interest to be displayed on the workstation display. It does this by causing the object for the shelf concerned to be accessed via the database manager 508 to display an appropriate graphical representation of the shelf. Also, the shelf viewer causes the objects for the cards on the shelf to be accessed via the database manager 508 to display a graphical representation of each card on the shelf. The card objects include data defining the object view and the position of the card within the shelf view. The shelf viewer is responsive to a fault parameter being set in the object for a card on the shelf to highlight the graphical representation of that card. In this way the operator can readily identify the physical card in which an error has occurred.

The shelf viewer is responsive to the operator selecting the highlighted card (e.g. by clicking on a mouse button when a mouse pointer is pointing at the card in question) to call the card viewer 520. The card viewer 518 causes a graphical representation of the card of interest to be displayed on the workstation display. It does this by causing the object for the card concerned to be accessed via the database manager 508 to display an appropriate graphical representation of the card. Also, the card viewer causes the objects for the network elements on the card to be accessed via the database manager 508 to display a graphical representation of each element on the card. The network element objects include data defining the object view and the position of the element on the card view. The card viewer is responsive to a fault parameter being set in the object for a network element on the card to highlight the graphical representation of that element. In this way the operator can readily identify the physical element in which an error has occurred.

The subscriber viewer 522 extends this process to a view of the subscriber line and the subscriber terminal 20.

It will be appreciated that the mechanism described above provides an effective and user friendly arrangement for identifying faulty components or elements within a network.

The updating of the fault parameters described above is performed by the site configuration database manager in response to alarm event messages received using the message structures described above from the physical elements at which faults have occurred. The alarm event messages are used to set alarm parameters in the lowest order objects associated with physical network elements. The establishment of alarm conditions (faults) can be achieved in any appropriate manner, either by commands sent out from the site controller or other control elements in the network at appropriate times to test for faults, or by the elements where a fault has occurred automatically reporting the faults to the site controller.

An alarm viewer 524 enables alarm events occurring at a site to be monitored on the display of the site controller work station. This provides a tabular display of all the events that have occurred in the system. One of the event entries in the tabular display will be highlighted by the alarm viewer to indicate the current event. The highlight can be moved through the use of cursor keys and/or mouse movements and clicks.

A command history viewer 526 is used to display transaction history data retrieved from the database. A performance statistical viewer 528 similarly permits the display of statistical data.

The site controller command structure described with reference to FIGS. 28 and 29 can be used for monitoring faults in a working network or for active control of the network. It can also be used as part of a simulator of part or all of the network for design and/or testing purposes.

Figure 30:
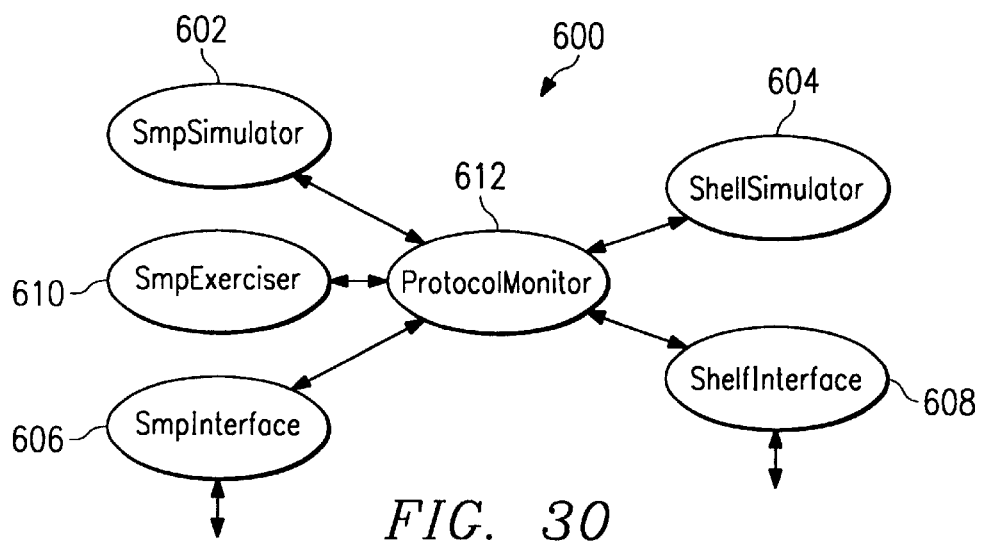
FIG. 30 is a schematic representation of the connection of a simulator to the central terminal of FIG. 3.

FIG. 30 is a schematic representation of elements of a simulator 600 incorporating the control structure described with reference to FIGS. 28 and 29 can be switched into the X.25 connection 57 between an element manager 58 and a shelf controller 72. The simulator 600 can be implemented by means of a personal computer or workstation comprising a processor, memory, display, keyboard, etc., suitably programmed to implement the desired processing functions.

As illustrated in FIG. 30, the simulator 600 includes an SMP simulator 602 which provides a simulation of the management processor (the site controller 56 or the element manager 58) and a shelf simulator 604 which simulates the operation of a modem shelf 46. The SMP simulator can provide basic management processor functions for testing the SMP protocol only, but it could be expanded to provide a full emulation of the site controller. The shelf simulation includes a full emulation of the physical shelf controller using largely the same software as the physical shelf controller. It also provides a simulation of selected management functions of the network elements on the modem shelf which are connected to the shelf controller, to the extent that they are able to respond to commands from the shelf controller and to generate alarms and other status messages in response to being activated. In alternative embodiments a full simulation of the central station could be provided.

The simulator includes an SMP interface 606, including the modular message handling structure described with reference to FIG. 21, which enables a real management processor to interface with the simulator by providing an interface between serial communications and the simulator's internal representation of SMP messages. The simulator also includes a shelf interface 608, including the modular message handling structure described with reference to FIG. 21, which enables the simulator to interface with a real shelf via RS232 port.

The simulation of each of the various elements described above is embodied in objects which define those elements, each object containing a functional emulation of the element concerned.

An SMP exerciser 610 permits a user to construct low level SMP messages for testing the shelf controller on a message by message basis.

The protocol monitor 612 provides a monitor function for SMP messages as they pass between the other parts of the system. Thus messages are passed via the monitor with the monitor providing the necessary routing functions, allowing messages to be displayed, stored and stepped through and otherwise keep track of the messages being sent. As such, the simulator provides a powerful diagnostic tool for the telecommunications network.

Although a particular embodiment has been described herein, it will be appreciated that the invention is not limited thereto and that many modifications and additions thereto may be made within the scope of the invention.

In summary, a wireless telecommunication system provides wireless telephone type communications for users remote from the public telephone switching network. The wireless telecommunication system includes a central terminal that communicates through CDMA spread spectrum radio frequency transmissions to a plurality of users serviced by subscriber terminals.

Although a particular embodiment has been described herein, it will be appreciated that the invention is not limited thereto and that many modifications and additions thereto may be made within the scope of the invention.

What is claimed is:

1. A method of establishing a downlink communication path in a wireless telecommunications system, comprising the steps of:
receiving a downlink signal having a master code sequence including an orthogonal code, wherein the downlink signal is received in an acquisition mode at a first transmitting power and a first transmitting rate;
adjusting a code and phase of a receiver slave code sequence in response to a code and phase of the master code sequence in order to recognize the downlink signal;
searching for a frame alignment signal within the downlink signal;
reading the downlink signal in response to finding two successive frame alignment signals;
identifying a channel identifier signal within the downlink signal, the channel identifier signal identifying the orthogonal code included in the master code sequence;
matching the channel identifier signal to a reference identifier code to verify that the correct downlink signal is being read;
acquiring the downlink signal in response to a successful match.

2. The method of claim 1, further comprising the step of:
releasing the downlink signal upon an unsuccessful match of the channel identifier signal to the reference identifier code.

3. The method of claim 1, further comprising the step of:
receiving traffic on the downlink signal, wherein the downlink signal is received in a traffic mode at the first transmitting power and a second transmitting rate greater than the first transmitting rate.

4. The method of claim 1, further comprising the step of:
receiving the downlink signal in a standby mode at a second transmitting power less than the first transmitting power and the first transmitting rate, wherein the standby mode occurs while waiting for traffic to be received after successful acquisition of the downlink signal.

5. The method of claim 1, further comprising the steps of:
identifying a code synchronization signal within the downlink signal;
adjusting a code and phase of a transmit slave code sequence for an uplink signal in response to the code synchronization signal.

6. The method of claim 5, further comprising the steps of:
identifying a power control signal within the downlink signal;
adjusting a transmitter power for an uplink signal in response to the power control signal.

7. The method of claim 6, further comprising the step of:
transmitting an uplink signal carrying a frame alignment signal and traffic information.

8. The method of claim 1, wherein the downlink signal carries control and traffic information in an unbalanced radio link termination protocol.

9. The method of claim 1, wherein the frame alignment signal and the channel identifier signal are carried in an overhead channel of the downlink signal.

10. The method of claim 1, wherein the frame alignment signal and the channel identifier signal has a constant value, the channel identifier signal having bits that are inverted on each frame of information so that the channel identifier signal is not recognized as the frame alignment signal.

11. A central terminal for wireless communication with a plurality of subscriber terminals at fixed distances in a wireless telecommunications network, comprising:
a transmit/receive unit operable to transmit a downlink signal having a master code sequence including an orthogonal code, and to receive an uplink signal having a slave code sequence, the downlink signal including a frame alignment signal to indicate a beginning of a frame of information, a code synchronization signal to adjust a transmitting rate of the uplink signal, a power control signal to adjust a transmitting power for the uplink signal, and a channel identifier signal identifying the orthogonal code included in the master code sequence, the channel identifier signal being useable by a subscriber terminal receiving the downlink signal to verify that that subscriber terminal is the correct subscriber terminal to receive the downlink signal, prior to a communication link with that subscriber terminal being established;
an analogue card operable to perform analog to digital conversion of the received uplink signal and digital to analog conversion for the transmitted downlink signal;
a modem card operable to perform convolution coding and spreading functions on the downlink signal, the modem card operable to perform synchronization recovery, despreading, and error correction functions on the uplink signal;
a tributary unit operable to interface the modem card with a wireline telecommunication network for the transmission and reception of calls to and from the subscriber terminals;
a shelf controller operable to communicate control and data information with the analogue card, the modem card, and the tributary unit, the shelf controller acting as a bus master and the analogue card, modem card, and tributary unit acting as bus slaves, the shelf controller communicating control and data information in a first balanced protocol with an external network controller and communicating control and data information with the analogue card, modem card, and tributary unit in a second unbalanced protocol.

12. The central terminal of claim 11, wherein the shelf controller is arranged to convert control and data information between the first balanced protocol and the second unbalanced protocol.

13. The central terminal of claim 11, wherein the first unbalanced protocol allows for either the shelf controller or the external network controller to initiate an exchange of control and data information.

14. The central terminal of claim 11, wherein the downlink signal and the uplink signal have a format of the second unbalanced protocol.

15. The central terminal of claim 11, wherein the first balanced protocol carries control and data information in message packets, each message packet containing one or more messages, each message within a message packet having the same fixed size, the message packet including fields to define a start of a message packet, an end of a message packet, a number of messages in a message packet, a destination for a message packet, a message packet type, and a message sequence identifier.

16. The central terminal of claim 11, wherein the second unbalanced protocol uses an alternating sequence bit to pass control and data information between the master shelf controller and the slave analogue card, modem card, and tributary unit.

17. The central terminal of claim 16, wherein the master and the slaves switch the sequence number to indicate that control and data information was successfully received.

18. A subscriber terminal for a wireless telecommunications system operating at a fixed distance from a central terminal, comprising:

a receiver interface operable to receive a downlink signal in an unbalanced protocol from the central terminal, the downlink signal having a master code sequence including an orthogonal code, the receiver interface separating the downlink signal into I and Q signal components;

a code generator and despreader operable to adjust a code and phase of a slave code sequence associated with the subscriber terminal in order to match a code and phase of the master code sequence of the downlink signal;

a convolutional decoder operable to perform forward error correction on the I and Q signal components and generate a downlink frame information signal therefrom;

a frame extractor operable to extract an overhead channel in the downlink frame information signal, the overhead channel including a frame alignment signal and a channel identifier signal, the channel identifier signal identifying the orthogonal code included in the master code sequence, the frame extractor arranged to identify a beginning of frame position after recognizing two successive frame alignment signals in order to read data in the downlink signal, the frame extractor being arranged to compare the channel identifier signal to a reference identifier code to verify that the correct downlink signal is being read prior to establishing a downlink communication path to the subscriber terminal.

19. The subscriber terminal of claim 18, wherein the frame alignment signal and the channel identifier signal have separate constant values, the channel identifier signal having bits that are inverted for each frame of information so that the channel identifier signal is not recognised as the frame alignment signal.

20. The subscriber terminal of claim 18, wherein the downlink signal is received at a first transmitting power and a first transmitting rate in an acquisition mode, the downlink signal being received at a second transmitting power less than the first transmitting power and the first transmitting rate in a standby mode after establishment of and prior to traffic flow on the downlink communication path, the downlink signal being received at the first transmitting power and a second transmitting rate greater than the first transmitting rate in a traffic mode.

21. The subscriber terminal of claim 18, further comprising:

a frame inserter operable to receive user traffic and place the user traffic and a frame alignment signal into an uplink frame information signal;

a code generator and spreader operable to generate a transmit slave code sequence for the uplink frame information signal, the code generator and spreader operable to separate the uplink frame information signal into I and Q signal components;

an analog transmitter operable to generate pulsed I and Q signals for transmission to the central terminal.

22. The subscriber terminal of claim 21, wherein the overhead channel of the downlink frame information signal includes a code synchronization signal, the code synchronization signal operable to adjust a code and phase of the transmit slave code sequence.

23. The subscriber terminal of claim 21, wherein the overhead channel of the downlink frame information signal includes a power control signal, the power control signal operable to adjust a transmitting power of the pulsed I and Q signals.

24. The subscriber terminal of claim 23, wherein the transmitting power of the pulsed I and Q signals is maintained within a desired range in response to the power control signal.

* * * * *